United States Patent
Iwama

(10) Patent No.: US 10,658,697 B2
(45) Date of Patent: May 19, 2020

(54) SECONDARY BATTERY, BATTERY PACK, ELECTRIC VEHICLE, ELECTRIC POWER STORAGE SYSTEM, ELECTRIC POWER TOOL, AND ELECTRONIC DEVICE

(71) Applicant: MURATA MANUFACTURING CO., LTD., Kyoto (JP)

(72) Inventor: Masayuki Iwama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 115 days.

(21) Appl. No.: 15/963,680

(22) Filed: Apr. 26, 2018

(65) Prior Publication Data
US 2018/0248222 A1    Aug. 30, 2018

Related U.S. Application Data

(63) Continuation of application No. PCT/JP2016/080910, filed on Oct. 19, 2016.

(30) Foreign Application Priority Data

Dec. 3, 2015  (JP) .................................. 2015-236663

(51) Int. Cl.
*H01M 10/0525* (2010.01)
*H01M 10/0565* (2010.01)
(Continued)

(52) U.S. Cl.
CPC ......... *H01M 10/0525* (2013.01); *B60L 50/64* (2019.02); *B60L 58/18* (2019.02);
(Continued)

(58) Field of Classification Search
CPC .. H01M 10/2525; H01M 4/133; H01M 4/134; H01M 10/0587; H01M 10/425;
(Continued)

(56) References Cited

U.S. PATENT DOCUMENTS 6,027,836 A     2/2000  Okada et al.
2002/0146619 A1* 10/2002 Saisho ................ H01M 2/18
                                                        429/129

(Continued)

FOREIGN PATENT DOCUMENTS

JP     07-057782      3/1995
JP     H07-057782 A   3/1995
(Continued)

OTHER PUBLICATIONS

Japanese Office Action dated Jul. 29, 2019 in corresponding Japanese Application No. 2017-553698.
(Continued)

*Primary Examiner* — Gary D Harris
(74) *Attorney, Agent, or Firm* — K&L Gates LLP

(57) ABSTRACT

A secondary battery is provided. The secondary battery includes a positive electrode, a negative electrode including a carbon material and a silicon-based material; and an electrolyte layer. The electrolyte layer includes an electrolytic solution and a polymeric compound and has one or more through-holes extending in a thickness direction of the electrolyte layer.

14 Claims, 6 Drawing Sheets

(51) Int. Cl.

| | |
|---|---|
| *H01M 10/0587* | (2010.01) |
| *H01M 4/134* | (2010.01) |
| *B60L 50/64* | (2019.01) |
| *H01M 4/133* | (2010.01) |
| *B60L 58/18* | (2019.01) |
| *H01M 4/36* | (2006.01) |
| *H01M 4/38* | (2006.01) |
| *H01M 4/587* | (2010.01) |
| *H01M 10/42* | (2006.01) |
| *H01M 4/02* | (2006.01) |

(52) U.S. Cl.
CPC .......... *H01M 4/133* (2013.01); *H01M 4/134* (2013.01); *H01M 4/364* (2013.01); *H01M 4/386* (2013.01); *H01M 4/587* (2013.01); *H01M 10/0565* (2013.01); *H01M 10/0587* (2013.01); *H01M 10/425* (2013.01); *H01M 2004/027* (2013.01); *H01M 2010/4271* (2013.01); *H01M 2220/20* (2013.01); *H01M 2220/30* (2013.01); *H01M 2300/0071* (2013.01); *H01M 2300/0082* (2013.01); *H01M 2300/0091* (2013.01); *Y02E 60/122* (2013.01); *Y02T 10/7011* (2013.01)

(58) Field of Classification Search
CPC ...... H01M 4/587; H01M 4/386; H01M 4/364; H01M 10/0565; H01M 2220/30; H01M 2220/20; H01M 2300/0091; H01M 2300/0082; H01M 2300/0071; H01M 2010/4271; H01M 2004/027; B60L 58/18; Y02T 10/7011; Y02E 60/122
USPC ........................................................ 429/101
See application file for complete search history.

(56) References Cited

U.S. PATENT DOCUMENTS

| | | | | |
|---|---|---|---|---|
| 2005/0064291 | A1* | 3/2005 | Sato ...................... | H01M 4/134 |
| | | | | 429/233 |
| 2012/0135306 | A1* | 5/2012 | Temmyo ............... | H01M 4/131 |
| | | | | 429/211 |
| 2014/0045032 | A1* | 2/2014 | Tanaka ................ | H01M 10/045 |
| | | | | 429/144 |
| 2016/0336614 | A1* | 11/2016 | Hatta ...................... | B60K 6/46 |

FOREIGN PATENT DOCUMENTS

| | | |
|---|---|---|
| JP | H08-195220 A | 7/1996 |
| JP | H08195220 | 7/1996 |
| JP | 2003-017131 | 1/2003 |
| JP | 2003-017131 A | 1/2003 |
| JP | 2003-331838 | 11/2003 |
| JP | 2003-331838 A | 11/2003 |
| JP | 2006-114254 | 4/2006 |
| JP | 2006-114254 A | 4/2006 |
| JP | 2015-187916 | 8/2015 |
| JP | 2015-187916 | 10/2015 |
| JP | 2015-187916 A | 10/2015 |
| WO | 2014/024534 A1 | 2/2014 |

OTHER PUBLICATIONS

Japanese Office Action dated Jan. 8, 2019 in corresponding Japanese Application No. 2017-553698.
Chinese Office Action dated Aug. 13, 2019 in corresponding Japanese Application No. 2017-553698.
International Search Report and Written Opinion issued in connection with International Patent Application No. PCT/JP2016/080910, dated Jan. 24, 2017. (9 pages).

* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC DEVICE

CROSS REFERENCE TO RELATED APPLICATIONS

The present application is a continuation of PCT patent application no. PCT/JP2016/080910, filed on Oct. 19, 2016, which claims priority to Japanese patent application no. JP2015-236663 filed on Dec. 3, 2015, the entire contents of which are being incorporated herein by reference.

BACKGROUND

The present technology generally relates to a secondary battery; and a battery pack, an electric vehicle, an electric power storage system, an electric power tool and an electronic device each including the secondary battery.

Various electronic devices such as a mobile phone and a personal digital assistant (PDA) have been widely spread, and it has been demanded to reduce the sizes of the electronic devices and to prolong the lives of the electronic devices. In response to this demand, the development of a battery, particularly a secondary battery that has a small size and a lightweight and can achieve a high energy density as a power supply, has been advanced.

The application of a secondary battery has been studied to the above-mentioned electronic devices as well as other use applications. Examples of the other use applications include a battery pack which can be installed removably in an electronic device and the like, an electric vehicle such as an electric car, an electric power storage system such as an electric power server for home use, and an electric power tool such as an electric drill.

The secondary battery is equipped with a positive electrode, a negative electrode and an electrolytic solution, wherein the electrolytic solution is generally installed in the secondary battery in such a state that a separator is impregnated with the electrolytic solution.

In addition, the electrolytic solution is sometimes installed in a secondary battery in such a state that the electrolytic solution is supported by a polymeric compound. This type of secondary battery is equipped with an electrolyte layer that is a so-called gel-like electrolyte. In a secondary battery equipped with the electrolyte layer, the leakage of the electrolytic solution can be prevented.

The constitution of the electrolyte layer can largely affect the battery properties of the secondary battery. Therefore, the constitution of the electrolyte layer has been studied extensively.

Concretely, for improving a cycle property or the like, a gel polymer layer having a plurality of three-dimensional open cells that are communicated with each other has been used. For achieving an excellent electrolytic solution retention property, a closed cell polymer foam has been used. For improving a load property or the like, the percentage of the total area of a plurality of cells formed in a carrier or the like is defined. For improving a battery capacity or the like, the average diameter of a plurality of circular regions observed by the observation of the surface of an electrolyte layer is defined.

SUMMARY

The present technology generally relates to a secondary battery; and a battery pack, an electric vehicle, an electric power storage system, an electric power tool and an electronic device each including the secondary battery.

A secondary battery according to an embodiment of the present technology includes: a positive electrode; a negative electrode including a carbon material and a silicon-based material; and an electrolyte layer that includes an electrolytic solution and a polymeric compound and the electrolyte layer includes one or more through-holes extending in a thickness direction of the electrolyte layer.

According to another embodiment of the present technology, a battery pack, an electric vehicle, an electric power storage system, an electric power tool and an electronic device each includes a secondary battery, wherein the secondary battery includes a positive electrode; a negative electrode including a carbon material and a silicon-based material; and an electrolyte layer that includes an electrolytic solution and a polymeric compound and the electrolyte layer includes one or more through-holes extending in a thickness direction of the electrolyte layer.

It should be understood that the term "silicon-based material" described herein is a general term for materials including silicon (Si) as a constituent element and is not limited to any specific silicon material.

A "through-hole" refers to a hole that extends in a thickness direction of an electrolyte layer and penetrates through the electrolyte layer. The through-hole according to an embodiment is a line of passage that extends from one to the other of two surfaces (a pair of surfaces that face to each other) of the electrolyte layer. Therefore, the through-hole is not branched to one or more branches and is not communicated with any other one or more through-holes. In other words, when focused on one through-hole, the number of openings (outlets) of the through-hole is only one on one surface and is also only one on the other surface.

Therefore, in the case where the electrolyte layer is in a sponge-like form having a plurality of voids (cells), for example, even though a passage that penetrates from one surface to the other surface via the plurality of voids is formed, the passage is not deemed as the through-hole described herein. This is because the passage is branched to one or more branches in the middle thereof, and therefore the passage cannot be deemed as a line of passage.

According to an embodiment of the present technology, a negative electrode of a battery includes a carbon material and a silicon-based material and the electrolyte layer has one or more through-holes extending in a thickness direction, and therefore excellent battery properties can be achieved. Furthermore, in a battery pack, an electric vehicle, an electric power storage system, an electric power tool or an electronic device according to an embodiment of the present technology, the same effect can be achieved.

It should be understood that the present technology is not limited to excellent cycle property and that other suitable properties relating to the present technology may be realized and as further described herein.

DETAILED DESCRIPTION

The present technology generally relates to a secondary battery, and a battery pack, an electric vehicle, an electric power storage system, an electric power tool and an electronic device each including the secondary battery. The present disclosure will be described based on examples with reference to the drawings, but the present disclosure is not to be considered limited to the examples, and various numerical values and materials in the examples are considered by way of example.

Firstly, the secondary battery according to one embodiment of the present technology will be described.

Figure 1:
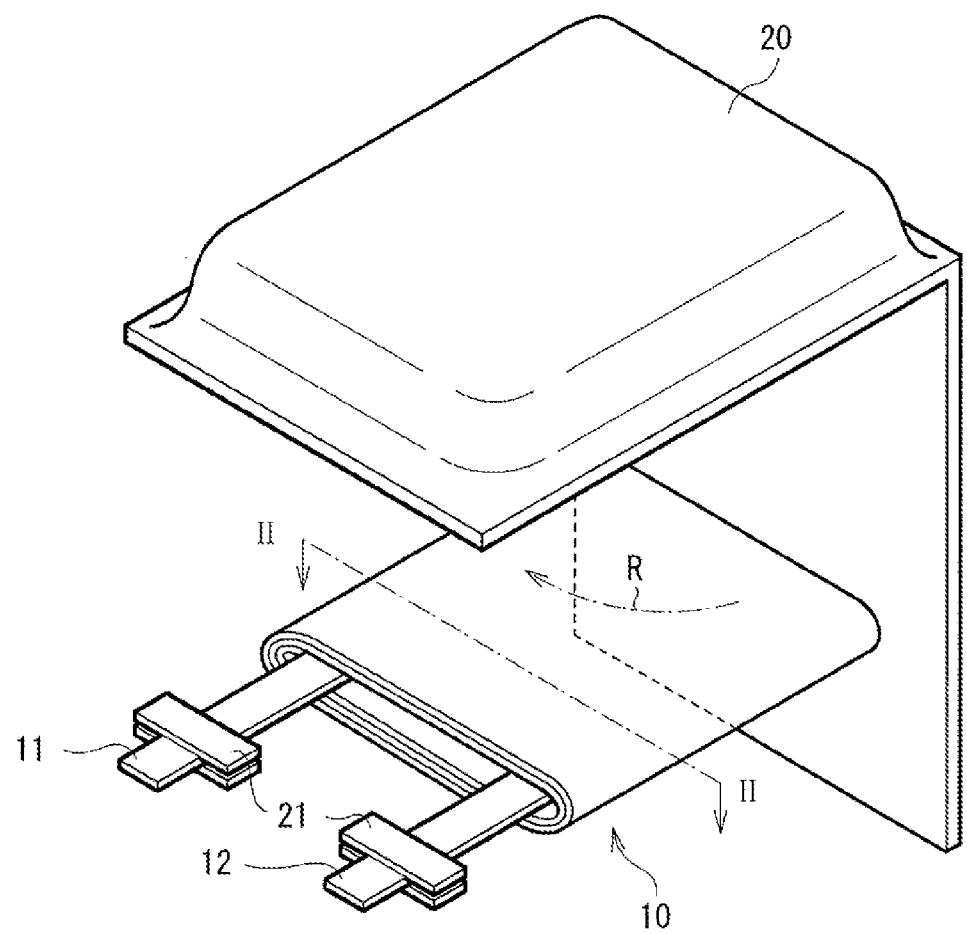
FIG. 1 is a perspective view illustrating the configuration of a (laminate film-type) secondary battery according to an embodiment of the present technology.
Figure 2:
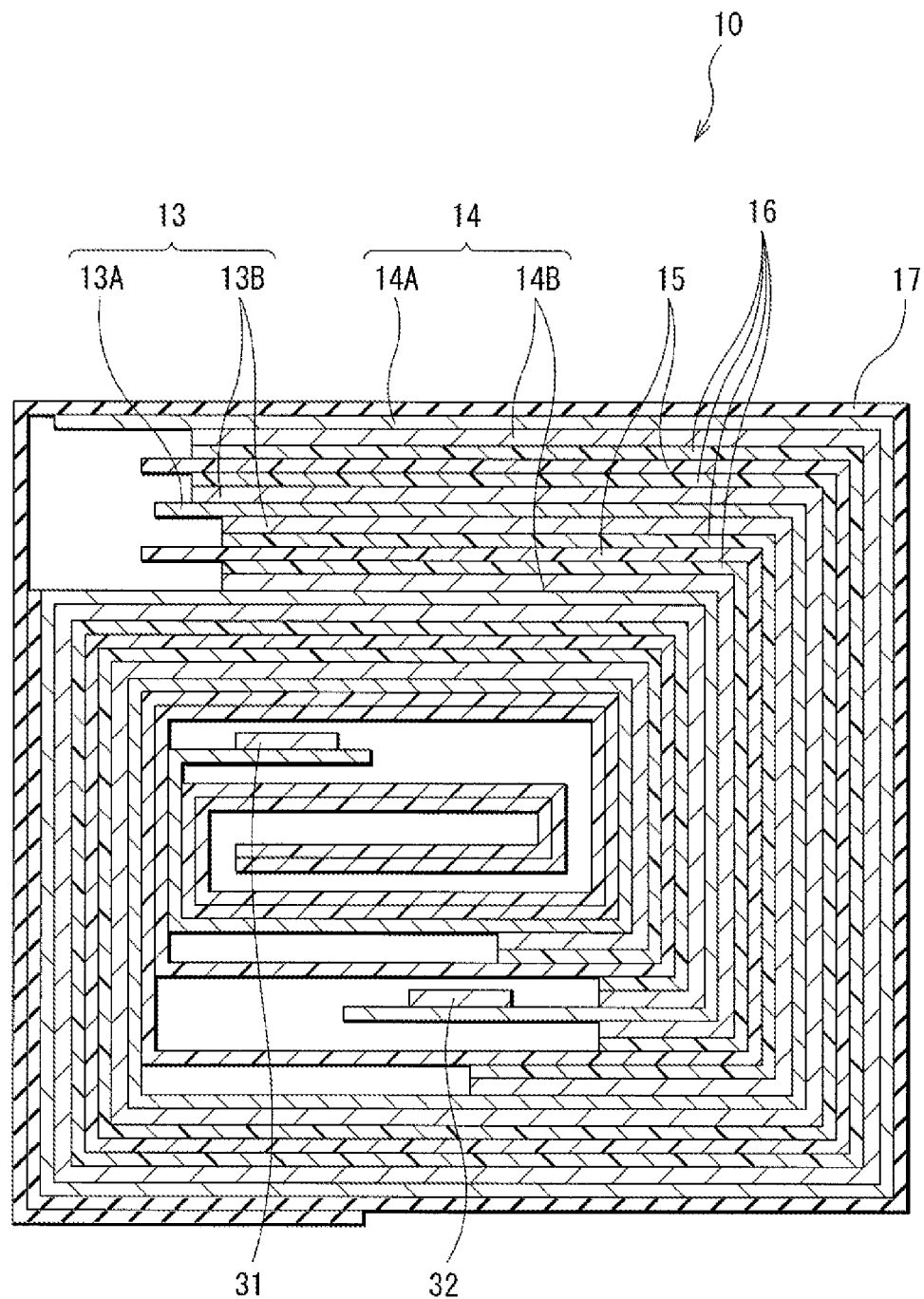
FIG. 2 is a cross-sectional view of a wound electrode body taken along line II-II of FIG. 1.
Figure 3:
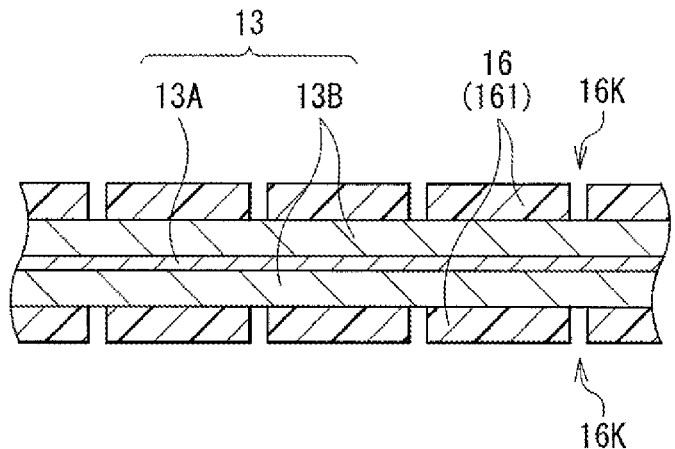
FIG. 3 is an enlarged cross-sectional view illustrating the configurations of a positive electrode and electrolyte layers (positive electrode-side electrolyte layers) shown in FIG. 2 according to an embodiment of the present technology.
Figure 4:
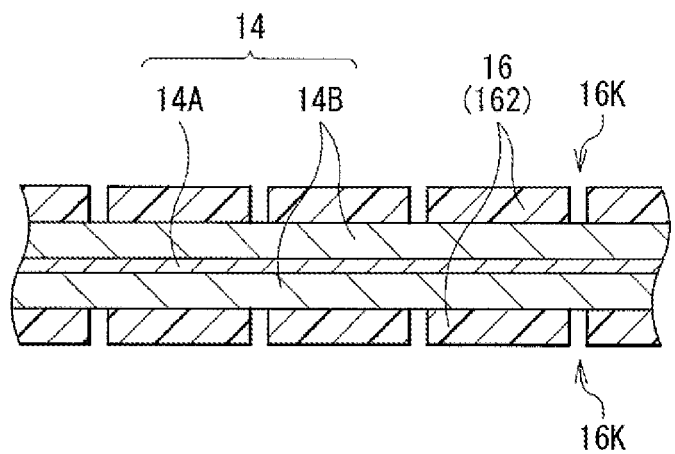
FIG. 4 is an enlarged cross-sectional view illustrating the configuration of a negative electrode and electrolyte layers (negative electrode-side electrolyte layers) shown in FIG. 2 according to an embodiment of the present technology.

FIG. 1 shows a perspective configuration of a secondary battery according to an embodiment. FIG. 2 shows a cross-sectional configuration of a wound electrode body 10 taken along line II-II of FIG. 1. FIG. 3 shows an enlarged cross-sectional configuration of each of a positive electrode 13 and electrolyte layers 16 shown in FIG. 2. FIG. 4 shows an enlarged cross-sectional configuration of a negative electrode 14 and electrolyte layers 16 shown in FIG. 2.

The secondary battery described herein is a secondary battery in which the capacity of the negative electrode 14 can be obtained by the storage/release of an electrode reactive substance, and has a so-called "laminate film-type" battery structure according to an embodiment.

The term "electrode reactive substance" refers to a substance involved in an electrode reaction. For example, in a lithium ion secondary battery in which a battery capacity can be obtained by the storage/release of lithium (Li), the electrode reactive substance is lithium (or a lithium ion). Hereinafter, a case where the secondary battery according to an embodiment of the present technology is a lithium ion secondary battery will be described as an example.

In this secondary battery according to an embodiment, a wound electrode body 10, i.e., a battery element, is housed in a film-like external packaging member 20, as shown in FIG. 1, for example. In the wound electrode body 10, a positive electrode 13 and a negative electrode 14 are laminated on each other with a separator 15 and electrolyte layers 16 interposed therebetween, and a laminate of the positive electrode 13 and the negative electrode 14, which are laminated on each other with the separator 15 and the electrolyte layers 16 interposed therebetween, is wound, for example A positive electrode lead 11 is attached to the positive electrode 13, and a negative electrode lead 12 is attached to the negative electrode 14. The outermost periphery of the wound electrode body 10 is protected by a protection tape 17.

The positive electrode lead 11 is led, for example, from the inside of the external packaging member 20 toward the outside of the external packaging member 20. The positive electrode lead 11 contains at least one type of electrically conductive material such as aluminum (Al). The electrically conductive material has, for example, a thin sheet-like or net-like form.

The negative electrode lead 12 is led, for example, in the same direction as that of the positive electrode lead 11, i.e., from the inside of the external packaging member 20 toward the outside of the external packaging member 20. The negative electrode lead 12 contains, for example, at least one type of electrically conductive material such as copper (Cu), nickel (Ni) and a stainless steel. The electrically conductive material has, for example, a thin sheet-like or net-like form.

The external packaging member 20 is, for example, a single film that can be folded in the direction shown by arrow R in FIG. 1, and a depression in which the wound electrode body 10 is to be housed is provided on at least a portion of the external packaging member 20. The external packaging member 20 is, for example, a laminate film composed of a melt-bonding layer, a metal layer and a surface protection layer that are laminated in this order. In the step of producing the secondary battery, the external packaging member 20 is folded in such a manner that the melt-bonding layers face each other with the wound electrode body 10 interposed therebetween and the outer peripheries of the melt-bonding layers are melt-bonded to each other. The external packaging member 20 may be composed of two laminate films that are bonded to each other with an adhesive agent or the like. The melt-bonding layer contains, for example, at least one type of film selected from a polyethylene film, a polypropylene film and others. The metal layer contains, for example, at least one type selected from an aluminum foil and others. The surface protection layer contains, for example, at least one type of film selected from a nylon film, a polyethylene terephthalate film and others.

Particularly, the external packaging member 20 is preferably an aluminum laminate film produced by laminating a polyethylene film, an aluminum foil and a nylon film in this order. The external packaging member 20 may be a laminate film having another lamination structure, or may be a polymer film (e.g., a polypropylene film) or a metal film.

Between the external packaging member 20 and the positive electrode lead 11, an adhesion film 21 is interposed for the purpose of preventing the invasion of external air, for example. Between the external packaging member 20 and the negative electrode lead 12, an adhesion film 21 is interposed, for example. The adhesion film 21 contains at least one type of material having close adhesiveness to both of the positive electrode lead 11 and the negative electrode lead 12. The material having the close adhesiveness is, for example, a polyolefin resin, and is more specifically at least one type of material selected from a polyethylene, a polypropylene, a modified polyethylene, a modified polypropylene and the like.

The positive electrode 13 according to an embodiment includes, for example, a positive electrode current collector 13A and a positive electrode active material layer 13B provided on the positive electrode current collector 13A, as shown in FIG. 2.

The positive electrode active material layer 13B according to an embodiment may be provided on only one surface of the positive electrode current collector 13A or may be provided on both surfaces of the positive electrode current collector 13A. In FIG. 2, a case where the positive electrode active material layers 13B are respectively provided on both surfaces of the positive electrode current collector 13A is shown.

The positive electrode current collector 13A contains, for example, at least one type of electrically conductive material. The type of the electrically conductive material is not particularly limited. For example, the electrically conductive material is a metallic material such as aluminum, nickel and a stainless steel, and may be an alloy containing at least two types of the metallic materials. The positive electrode current collector 13A may have a single-layer structure or a multilayer structure.

The positive electrode active material layer 13B contains, as a positive electrode active material, at least one type of positive electrode material capable of storing/releasing lithium. The positive electrode active material layer 13B may further contain at least one type of another material, such as a positive electrode binder and a positive electrode conducting agent.

The positive electrode material preferably contains at least one type of lithium-containing compound. The type of the lithium-containing compound is not particularly limited. Particularly, a lithium-containing composite oxide and a lithium-containing phosphoric acid compound are preferred. This is because a high energy density can be achieved.

The term "lithium-containing composite oxide" refers to an oxide that contains lithium and at least one type of element other than lithium (referred to as "another element", hereinafter) as constituent elements. The lithium-containing oxide has, for example, at least one type of crystal structure, such as a layered rock salt-type crystal structure and a spinel-type crystal structure.

The term "lithium-containing phosphoric acid compound" refers to a phosphoric acid compound that contains lithium and at least one type of element other than lithium as constituent elements. The lithium-containing phosphoric acid compound has at least one type of crystal structure, such as an olivine-type crystal structure.

The type of the "another element" is not particularly limited, as long as at least one type of arbitrary element (excluding lithium) is contained. Particularly, the "another element" preferably includes at least one type of element selected from elements belonging to Groups 2 to 15 in the long-period periodic table. More specifically, the "another element" is more preferably at least one type of metal element, such as nickel, cobalt, manganese and iron. This is because a high voltage can be achieved.

Examples of the lithium-containing composite oxide having a layered rock salt-type crystal structure include compounds respectively represented by formulae (1) to (3).

$$Li_aMn_{(1-b-c)}Ni_bM1_cO_{(2-d)}F_e \qquad (1)$$

(wherein M1 represents at least one type of element selected from cobalt, magnesium, aluminum, boron, titanium, vanadium, chromium, iron, copper, zinc, zirconium, molybdenum, tin, calcium, strontium and tungsten; and a to e satisfy the following formulae: $0.8 \leq a \leq 1.2$, $0 < b < 0.5$, $0 \leq c \leq 0.5$, $(b+c) < 1$, $-0.1 \leq d \leq 0.2$ and $0 \leq e \leq 0.1$; wherein the composition of lithium varies depending on whether the secondary battery is in a charged state or a discharged state, and a represents a value in the case where the secondary battery is in a completely discharged state.)

$$Li_aNi_{(1-b)}M2_bO_{(2-c)}F_d \qquad (2)$$

(wherein M2 represents at least one type of element selected from cobalt, manganese, magnesium, aluminum, boron, titanium, vanadium, chromium, iron, copper, zinc, molybdenum, tin, calcium, strontium and tungsten; and a to d satisfy the following formulae: $0.8 \leq a \leq 1.2$, $0.005 \leq b \leq 0.5$, $-0.1 \leq c \leq 0.2$ and $0 \leq d \leq 0.1$; wherein the composition of lithium varies depending on whether the secondary battery is in a charged state or a discharged state, and a represents a value in the case where the secondary battery is in a completely discharged state.)

$$Li_aCo_{(1-b)}M3_bO_{(2-c)}F_d \qquad (3)$$

(wherein M3 represents at least one type of element selected from nickel, manganese, magnesium, aluminum, boron, titanium, vanadium, chromium, iron, copper, zinc, molybdenum, tin, calcium, strontium and tungsten; and a to d satisfy the following formulae: $0.8 \leq a \leq 1.2$, $0 \leq b < 0.5$, $-0.1 \leq c \leq 0.2$ and $0 \leq d \leq 0.1$; wherein the composition of lithium varies depending on whether the secondary battery is in a charged state or a discharged state, and a represents a value in the case where the secondary battery is in a completely discharged state.)

Examples of the lithium-containing composite oxide having a layered rock salt-type crystal structure include $LiNiO_2$, $LiCoO_2$, $LiCO_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$ and $Li_{1.15}(Mn_{0.65}Ni_{0.22}Co_{0.13})O_2$.

In the case where the lithium-containing composite oxide having a layered rock salt-type crystal structure contains nickel, cobalt, manganese and aluminum as the constituent elements thereof, the atomic ratio of nickel is preferably 50 at. % or more. This is because a high energy density can be achieved.

An example of the lithium-containing composite oxide having a spinel-type crystal structure is a compound represented by formula (4).

$$Li_aMn_{(2-b)}M4_bO_cF_d \qquad (4)$$

(wherein M4 represents at least one type of element selected from cobalt, nickel, magnesium, aluminum, boron, titanium, vanadium, chromium, iron, copper, zinc, molybdenum, tin, calcium, strontium and tungsten; and a to d satisfy the following formulae: $0.9 \leq a \leq 1.1$, $0 \leq b \leq 0.6$, $3.7 \leq c \leq 4.1$ and $0 \leq d \leq 0.1$; wherein the content of lithium varies depending on whether the secondary battery is in a charged state or a discharged state, and a represents a value in the case where the secondary battery is in a completely discharged state.)

An example of the lithium-containing composite oxide having a spinel-type crystal structure is $LiMn_2O_4$.

An example of the lithium-containing phosphoric acid compound having an olivine-type crystal structure is a compound represented by formula (5).

$$Li_aM5PO_4 \qquad (5)$$

(wherein M5 represents at least one type of element selected from cobalt, manganese, iron, nickel, magnesium, aluminum, boron, titanium, vanadium, niobium, copper, zinc, molybdenum, calcium, strontium, tungsten and zirconium; and a satisfies the formula: 0.9≤a≤1.1; wherein the content of lithium varies depending on whether the secondary battery is in a charged state or a discharged state, and a represents a value in the case where the secondary battery is in a completely discharged state.)

Examples of the lithium-containing phosphoric acid compound having an olivine-type crystal structure include LiFePO$_4$, LiMnPO$_4$, LiFe$_{0.5}$Mn$_{0.5}$PO$_4$ and LiFe$_{0.3}$Mn$_{0.7}$PO$_4$.

The lithium-containing composite oxide may be a compound represented by formula (6) or the like.

$$(Li_2MnO_3)_x(LiMnO_2)_{1-x} \qquad (6)$$

(wherein x satisfies the formula: 0≤x≤1).

In addition, the positive electrode material may be, for example, an oxide, a disulfide, a chalcogenide and an electrically conductive polymer. Specific examples of the oxide include titanium oxide, vanadium oxide and manganese dioxide. Specific examples of the disulfide include titanium disulfide and molybdenum sulfide. A specific example of the chalcogenide is niobium selenide. Specific examples of the electrically conductive polymer include sulfur, a polyaniline and a polythiophene.

The positive electrode material is not limited to the above-mentioned materials, and may be another material.

The positive electrode binder includes, for example, at least one type of compound selected from a synthetic rubber, a polymeric compound and others. Specific examples of the synthetic rubber include a styrene butadiene-type rubber, a fluorine-containing rubber and an ethylene propylene diene. Specific examples of the polymeric compound include polyvinylidene fluoride, polyacrylic acid, a polyimide, a polyamide, a polyamideimide, polytetrafluoroethylene, polyacrylonitrile and carboxy methyl cellulose.

The positive electrode conducting agent includes, for example, at least one type of material selected from a carbon material and the like. Specific examples of the carbon material include graphite, carbon black, acetylene black and Ketjen black. The positive electrode conducting agent may be a material having electric conductivity, such as a metallic material and an electrically conductive polymer.

The negative electrode 14 includes, for example, a negative electrode current collector 14A and a negative electrode active material layer 14B provided on the negative electrode current collector 14A, as shown in FIG. 2.

The negative electrode active material layer 14B may be provided on only one surface of the negative electrode current collector 14A, or may be provided on both surfaces of the negative electrode current collector 14A. In FIG. 2, for example, a case where the negative electrode active material layers 14B are provided respectively on both surfaces of the negative electrode current collector 14A is shown.

The negative electrode current collector 14A contains, for example, at least one type of electrically conductive material. The type of the electrically conductive material is not particularly limited, and the electrically conductive material may be a metallic material such as copper, aluminum, nickel and a stainless steel or may be an alloy containing two types or more of the metallic materials. The negative electrode current collector 14A may be in a single-layer structure or a multilayer structure.

The surface of the negative electrode current collector 14A is preferably roughened. This is because the close adhesiveness of the negative electrode active material layer 14B to the negative electrode current collector 14A can be improved due to a so-called anchoring effect. In this case, only at least a portion of the surface of the negative electrode current collector 14A which faces the negative electrode active material layer 14B may be roughened. An example of the method for the roughening is a method in which microparticles are formed by employing an electrolysis treatment. In the electrolysis treatment, microparticles are formed on the surface of the negative electrode current collector 14A in an electrolysis vessel by the electrolysis method. Therefore, protrusions and depressions are formed on the surface of the negative electrode current collector 14A. A copper foil formed by the electrolysis method is generally called "an electrodeposited copper foil".

The negative electrode active material layer 14B contains, as a negative electrode active material, at least one type of negative electrode material that can store/release lithium. The negative electrode active material layer 14B may further contain at least one type of other materials including a negative electrode binder and a negative electrode conducting agent. Details about the negative electrode binder and the negative electrode conducting agent are, for example, as described in detail with respect to the positive electrode binder and the positive electrode conducting agent.

In order to prevent the accidental deposition of metal lithium on the negative electrode 14 during charging, it is preferred that the chargeable capacity of the negative electrode material is larger than the discharge capacity of the positive electrode 13. Namely, it is preferred that the electrochemical equivalent of the negative electrode material capable of storing/releasing lithium is larger than that of the positive electrode 13.

The negative electrode material contains a carbon material and a silicon-based material. Namely, the negative electrode active material layer 14B contains two types of negative electrode materials (i.e., a carbon material and a silicon-based material) as the negative electrode active materials. The term "silicon-based material" is a general term for materials each containing silicon as the constituent element thereof, and the silicon-based material includes a simple substance of silicon within the scope thereof. Only one type of carbon material may be used, or two or more types of carbon materials may be used according to an embodiment. Similarly, only one type of silicon-based material may be used, or two or more types of silicon-based materials may be used.

The reason why the carbon material is used as the negative electrode material is because the change in crystal structure of lithium during storage or release or storage and release is very small and therefore a high energy density can be achieved steadily. It is also because the carbon material can also act as a negative electrode conducting agent and therefore the electric conductivity of the negative electrode active material layer 14B can be improved.

The reason why the silicon-based material is used as the negative electrode material is because the ability to storage or release or storage and release lithium is superior and therefore an extremely high energy density can be achieved.

The reason why the carbon material and the silicon-based material are used in combination as the negative electrode materials is because a high theoretical capacity (in other words, a battery capacity) can be achieved while preventing the expansion/shrinkage of the negative electrode active material layer 14B during charging and discharging. In more detail, the silicon-based material has an advantage of having a high theoretical capacity, while having the disadvantage of being intensively expanded or shrunk during charging and discharging. In contrast, the carbon material has the disadvantage of having a low theoretical capacity, while having the advantage of being unlikely to expand or shrink during charging and discharging. Therefore, by using the carbon material and the silicon-based material in combination, it becomes possible to prevent the expansion or shrinkage of the negative electrode active material layer 14B during charging and discharging and it also becomes possible to achieve a high theoretical capacity.

Specific examples of the carbon material include easily graphitizable carbon, non-graphitizable carbon and graphite. It is preferred that the lattice spacing of (002) plane of non-graphitizable carbon is 0.37 nm or more and the lattice spacing of (002) plane of graphite is 0.34 nm or less. More specific examples of the carbon material include a pyrolytic carbon-type substance, a coke-type substance, a glass-like carbon fiber, a fired organic polymeric compound, activated carbon and carbon black. The coke-type substance includes, within the scope thereof, pitch coke, needle coke and petroleum coke. The fired organic polymeric compound is a product produced by firing (carbonizing) a polymeric compound, e.g., a phenolic resin and a furan resin, at an appropriate temperature. In addition, the carbon material may be low crystalline carbon that is heat-treated at a temperature equal to or lower than about 1000° C., or may be amorphous carbon.

The shape of the carbon material may be either one of a fiber-like form, a spherical form, a granular form and a scale-like form according to embodiments. Particularly, it is preferred that the carbon material includes at least two types of carbon materials having different forms from each other. This is because the filling property of the carbon material can be improved and therefore a higher energy density can be achieved.

The type of the silicon-based material is not particularly limited, as long as the silicon-based material includes at least one type of material that contains silicon as the constituent element. Namely, the silicon-based material may be a simple substance of silicon, or a silicon compound, or a silicon alloy, or a combination of two types or more of them. The silicon-based material may also be a material that contain a phase composed of at least one type of a simple substance of silicon, a silicon compound and a silicon alloy as at least a portion thereof. The texture of the silicon-based material is, for example, a solid solution, a eutectic material (a eutectic mixture), an intermetallic compound and a coexistent substance of two types or more of them.

The term "simple substance" as used herein refers to a simple or elemental substance in a general sense (which may contain impurities in a trace amount), and does not necessarily mean a simple or elemental substance having a purity of 100%. The definition for the simple substance is applicable hereinafter.

The silicon alloy may be a material that contains at least one type of metal element as a constituent element, or may be a material that contains at least one type of metalloid as a constituent element. Alternatively, the silicon alloy may contain at least one type of non-metal element as a constituent element.

The silicon alloy also contains, for example, at least one type of element selected from tin, nickel, copper, iron, cobalt, manganese, zinc, indium, silver, titanium, germanium, bismuth, antimony and chromium as a non-silicon constituent element. The silicon compound contains, for example, at least one type of element selected from carbon and oxygen as a non-silicon constituent element. The silicon compound may contain at least one type of element selected from the group of those elements which are mentioned about the silicon alloy in the description, as a non-silicon constituent element.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $SiTiNi$, $SiTiAl$, $Si_2N_2O$, $SiO_x$ (0<x≤2) and $LiSiO$.

Among these compounds, the silicon compound is preferably silicon oxide ($SiO_x$). This is because silicon oxide has excellent reversibility with respect to the storage/release of lithium. By using silicon oxide, it becomes possible for the secondary battery to have an excellent cycle property and the like.

The value x is not particularly limited, as long as the value x falls within the above-mentioned range (0<x≤2). The value x is preferably 0.5≤x≤1.5, because a high battery capacity can be achieved and the reversibility with respect to the storage/release of lithium can be improved. In detail, when x is smaller than 0.5, the battery capacity increases, while amount of expansion of silicon oxide during charging and discharging increases. As a result, the reversibility with respect to the storage/release of lithium may decrease due to the pulverization of silicon oxide. When the value x is greater than 1.5, on the other hand, the reversibility with respect to the storage/release of lithium is improved, while the battery capacity may decrease.

The average particle diameter (median diameter D50) of the silicon compound ($SiO_x$) is not particularly limited, and is, for example, 0.1 μm to 10 μm. The specific surface area of the silicon compound ($SiO_x$) is not particularly limited, and is, for example, 1 m²/g to 10 m²/g.

The mixing ratio between the carbon material and the silicon-based material is not particularly limited. Particularly, the ratio of the weight W2 of the silicon-based material to the sum total of the weight W1 of the carbon material and the weight W2 of the silicon-based material is preferably 2% by weight to 30% by weight, more preferably 5% by weight to 20% by weight. This is because the mixing ratio between the carbon material and the silicon-based material is optimized and therefore a higher theoretical capacity can be achieved while preventing the expansion/shrinkage of the negative electrode active material layer 14B during charging and discharging. This ratio (% by weight) can be calculated in accordance with the formula: [W2/(W1+W2)]×100.

The negative electrode material may be a combination of the carbon material and the silicon-based material as mentioned above, and may additionally contain at least one type of another material. In other words, the negative electrode active material layer 14B may contain at least one type of another negative electrode material as the negative active material, in addition to two types of negative electrode materials (i.e., the carbon material and the silicon-based material).

The above-mentioned another negative electrode material is, for example, a material that contains at least one type of component selected from metal elements and metalloids as a constituent element (i.e., a metal-based material). This is because a high energy density can be achieved. In this regard, the above-mentioned silicon-based material is excluded from the scope of the metal-based material described in this section.

The metal-based material may be a simple substance, or a compound, or an alloy, or a combination of two types or more of them. The metal-based material may also be a material that contains a phase composed of at least one type of a simple substance, a compound and an alloy as at least a portion thereof. The alloy includes a material that contains at least two types of metal elements as constituent elements, as well as a material that contains at least one type of metal element and at least one type of metalloid as constituent elements. The alloy may also contain at least one type of non-metal element as a constituent element. The texture of this metal-based material is, for example, a solid solution, a eutectic material (a eutectic mixture), an intermetallic compound and a coexistent substance of two types or more of them.

For example, the metal element includes at least one type of metal element capable of forming an alloy in conjunction with lithium, and the metalloid includes at least one type of metalloid capable of forming an alloy in conjunction with lithium. Specific examples of the metal element and the metalloid include magnesium (Mg), boron (B), aluminum (Al), gallium (Ga), indium (In), germanium (Ge), tin (Sn), lead (Pb), bismuth (Bi), cadmium (Cd), silver (Ag), zinc, hafnium (Hf), zirconium, yttrium (Y), palladium (Pd) and platinum (Pt).

Among these metal elements, tin is preferred. This is because tin has an excellent ability to store/release lithium and therefore a remarkably high energy density can be achieved.

A material containing tin as a constituent element (i.e., a tin-based material) may be a simple substance of tin, or a tin compound, or a tin alloy, or a combination of two types or more of them. The tin-based material may be a material that contains a phase composed of at least one type of a simple substance of tin, a tin compound and a tin alloy as at least a portion thereof.

The tin alloy contains, for example, at least one type of element selected from silicon, nickel, copper, iron, cobalt, manganese, zinc, indium, silver, titanium, germanium, bismuth, antimony and chromium as a non-tin constituent element. The tin compound contains, for example, at least one type of element selected from carbon and oxygen as a non-tin constituent element. The tin compound may contain, for example, at least one type of element selected from the group of those elements which are mentioned about the tin alloy in the description, as a non-tin constituent element.

Specific examples of the tin alloy and the tin compound include $SnO_w$ ($0<w \leq 2$), $SnSiO_3$, LiSnO and $Mg_2Sn$.

Particularly, the tin-based material is preferably a material that also contains, in addition to tin that is a first constituent element, a second constituent element and a third constituent element (i.e., an Sn-containing material). The second constituent element includes, for example, at least one type of element selected from cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth and silicon. The third constituent element includes, for example, at least one type of element selected from boron, carbon, aluminum and phosphorus (P). This is because a high battery capacity, an excellent cycle property and the like can be achieved when the Sn-containing material contains the second constituent element and the third constituent element.

Particularly, the Sn-containing material is preferably a material that contains tin, cobalt and carbon as the constituent elements thereof (i.e., an Sn—Co—C-containing material). In the Sn—Co—C-containing material, the content of carbon is, for example, 9.9% by mass to 29.7% by mass and each of the content ratio between tin and cobalt (which represented by the formula: Co/(Sn+Co)) is 20% by mass to 70% by mass. This is because a high energy density can be achieved.

It is preferred that the Sn—Co—C-containing material has a phase containing tin, cobalt and carbon, wherein the phase is low crystalline or amorphous. The phase is a phase capable of reacting with lithium (i.e., a reactive phase), and therefore excellent properties can be achieved due to the presence of the reactive phase. As a matter of course, the reactive phase may contain a low crystalline portion and an amorphous portion. It is preferred that the half bandwidth (a diffraction angle: $2\theta$) of a diffraction peak of the reactive phase as measured by X-ray diffraction is 1° or more when CuK$\alpha$ line is used as a characteristic X-ray and the scanning rate is 1°/min. This is because, in the Sn—Co—C-containing material, lithium can be stored/released more smoothly and the reactivity of the Sn—Co—C-containing material with the electrolytic solution can be reduced. In addition to the low crystalline or amorphous phase, the Sn—Co—C-containing material may also contain a phase that contains simple substance of the constituent elements thereof or some of the elements.

Whether or not a diffraction peak obtained by the X-ray diffraction corresponds to a reactive phase capable of reacting with lithium can be determined easily by, for example, comparing X-ray diffraction charts before and after the electrochemical reaction with lithium with each other. Concretely, for example, when the position of a diffraction peak is shifted before and after the electrochemical reaction with lithium, it is determined that the diffraction peak corresponds to a reactive phase capable of reacting with lithium. In this case, a diffraction peak of the low crystalline or amorphous reactive phase appears at an angle $2\theta$ between 20° and 50°. It is considered that this reactive phase contains, for example, the above-mentioned constituent elements and becomes low crystalline or amorphous mainly due to the presence of carbon.

In the Sn—Co—C-containing material, it is preferred that at least some of carbon atoms, which are constituent elements, are bonded to the metal element or the metalloid that is another constituent element. This is because the coagulation or crystallization of tin or the like can be prevented. The state of binding between the elements can be confirmed by employing, for example, an X-ray photoelectron spectroscopy (XPS). In a commercially available device, Al-K$\alpha$ line, Mg-K$\alpha$ line or the like is used as soft X-ray, for example. In the case where at least some of carbon atoms are bonded to a metal element, a metalloid or the like, the peak corresponding to an associated wave of is orbit (C1s) of a carbon atom appears in a region lower than 284.5 eV. In this regard, the peak corresponding to 4f orbit (Au4f) of a gold atom is energy-calibrated so as to appear at 84.0 eV. In general, a surface-contaminating carbon atom is present on the surface of a substance. Therefore, it is defined that the peak corresponding to C1s of the surface-contaminating carbon atom appears at 284.8 eV, and the peak is employed as an energy base. In the XPS measurement, the wave form of the peak corresponding to C1s can be defined by a form including a peak corresponding to the surface-contaminating carbon atom and a peak corresponding to a carbon atom contained in the Sn—Co—C-containing material. The two peaks can be separated by the analysis using a commercially available software. In the analysis of a wave form, the position of a main peak appearing on the minimum binding energy side is employed as an energy base (284.8 eV).

The Sn—Co—C-containing material is not limited to a material (Sn—Co—C) that contains only tin, cobalt and carbon as the constituent elements. In addition to tin, cobalt and carbon, the Sn—Co—C-containing material may further contain at least one type of element selected from silicon, iron, nickel, chromium, indium, niobium, germanium, titanium, molybdenum, aluminum, phosphorus, gallium and bismuth and the like as a constituent element.

In addition to the Sn—Co—C-containing material, a material that contains tin, cobalt, iron and carbon as the constituent elements thereof (i.e., an Sn—Co—Fe—C-containing material) is also preferred. The composition of the Sn—Co—Fe—C-containing material may be any one. As one example, in the case where it is intended to set the content of iron to a smaller amount, the content of carbon is 9.9% by mass to 29.7% by mass, the content of iron is 0.3% by mass to 5.9% by mass, and the content ratio between tin and cobalt (which is represented by the formula: Co/(Sn+Co)) is 30% by mass to 70% by mass. In the case where it is intended to set the content of iron to a larger amount, the content of carbon is 11.9% by mass to 29.7% by mass, the content ratio between tin, cobalt and iron (which is represented by the formula: (Co+Fe)/(Sn+Co+Fe)) is 26.4% by mass to 48.5% by mass, and the content ratio between cobalt and iron (which is represented by the formula: Co/(Co+Fe)) is 9.9% by mass to 79.5% by mass. This is because a high energy density can be achieved when the composition falls within the above-mentioned ranges. The physical properties (e.g., a half bandwidth) of the Sn—Co—Fe—C-containing material are the same as those described with respect to the Sn—Co—C-containing material.

The above-mentioned other negative electrode material may also be, for example, a metal oxide or a polymeric compound. Specific examples of the metal oxide include iron oxide, ruthenium oxide and molybdenum oxide. Specific examples of the polymeric compound include polyacetylene, polyaniline and polypyrrole.

The negative electrode active material layer 14B can be formed by at least one type of method selected from a coating method, a vapor phase method, a liquid phase method, a thermal spraying method and a firing method (a sintering method).

The coating method is, for example, a method in which a particulate (powdery) negative electrode active material is mixed with a negative electrode binder and the like, then a resultant mixture is dispersed in an organic solvent or the like, and then the resultant solution is applied onto the negative electrode current collector 14A.

Examples of the vapor phase method include a physical deposition method and a chemical deposition method. More specific examples of the vapor phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which the negative electrode active material that is in a molten or half-molten state is sprayed onto the surface of the negative electrode current collector 14A.

The firing method is, for example, a method in which a mixture dispersed in an organic solvent or the like is applied onto the negative electrode current collector 14A by a coating method and then the mixture is heat-treated at a temperature higher than the melting point of the negative electrode binder or the like. Examples of the firing method include an atmospheric firing method, a reaction firing method and a hot-press firing method.

In the secondary battery, as mentioned above, in order to prevent accidental deposition of lithium onto the negative electrode 14 during discharging, the electrochemical equivalent of the negative electrode material that can store/release lithium is larger than that of the positive electrode. In the case where the open circuit voltage (i.e., battery voltage) upon being fully charged is 4.25 V or more, even if the same positive electrode active material is used, the release amount of lithium per unit area increases compared with a case where the open circuit voltage is 4.20 V. Therefore, the amounts of the positive electrode active material and the negative electrode active material are adjusted depending on the released amount of lithium. As a result, a high energy density can be achieved.

The separator 15, in an embodiment, is arranged between the positive electrode 13 and the negative electrode 14, and the positive electrode 13 and the negative electrode 14 are isolated from each other with the separator 15 interposed therebetween. The separator 15 enables lithium ions to pass while preventing the occurrence of short-circuiting caused by the contact between the positive electrode 13 and the negative electrode 14.

The separator 15 includes, for example, at least one type of porous membrane made from a synthetic resin, a ceramic or the like, and may be a laminate membrane made of at least two types of porous membranes. The synthetic resin contains, for example, at least one type of material selected from polytetrafluoroethylene, polypropylene and polyethylene.

The separator 15 includes, for example, the above-mentioned porous membrane (base material layer) and a polymeric compound layer provided on the base material layer. This is because the close adhesiveness of the separator 15 to each of the positive electrode 13 and the negative electrode 14 can be improved and therefore the wound electrode body 10 may be hardly distorted. As a result, the occurrence of a decomposition reaction of the electrolytic solution can be prevented and the leakage of the electrolytic solution with which the base material layer is impregnated can also be prevented, and therefore the electric resistivity may rarely increase and the secondary battery is unlikely to be swollen even when charge and discharge operations are repeated.

The polymeric compound layer may be provided on only one surface of the base material layer, or may be provided on both surfaces of the base material layer. The polymeric compound layer contains, for example, at least one type of polymeric compound such as polyvinylidene fluoride. This is because polyvinylidene fluoride has excellent physical strength and is electrically stable. For the formation of the polymeric compound layer, a solution prepared by dissolving the polymeric compound in an organic solvent or the like is applied onto the base material layer and then the base material layer is dried, for example. It is also possible to immerse the base material layer in the solution and then dry the base material layer.

The electrolyte layer 16 contains an electrolytic solution and a polymeric compound. In the electrolyte layer 16, the electrolytic solution is supported by the polymeric compound. Namely, the electrolyte layer 16 described in this section is a so-called gel-like electrolyte. The reason why the electrolyte layer 16 is used is because a high ionic conductivity (e.g., 1 mS/cm or more at room temperature) can be achieved and the leakage of the electrolytic solution can be prevented.

In this example, the electrolyte layer 16 (positive electrode-side electrolyte layer 161) is provided on the positive electrode 13 (the positive electrode active material layer 13B), and the electrolyte layer 16 (the negative electrode-side electrolyte layer 162) is provided on the negative electrode 14 (the negative electrode active material layer 14B), for example Therefore, the positive electrode-side electrolyte layer 161 is arranged between the positive electrode 13 and the separator 15, and the negative electrode-side electrolyte layer 162 is arranged between the negative electrode 14 and the separator 15.

In the case where the positive electrode active material layers 13B are provided respectively on both surfaces of the positive electrode current collector 13A, the positive electrode-side electrolyte layer 161 may be provided on each of the two positive electrode active material layers 13B, or may be provided only either one of the two positive electrode active material layers 13B.

In the case where the negative electrode active material layers 14B are provided respectively on both surfaces of the negative electrode current collector 14A, the negative electrode-side electrolyte layer 162 may be provided on each of the two negative electrode active material layers 14B or may be provided only on either one of the two negative electrode active material layers 14B.

It is possible that the positive electrode-side electrolyte layer 161 is provided on the positive electrode 13, while the negative electrode-side electrolyte layer 162 is not provided on the negative electrode 14. It is also possible that the negative electrode-side electrolyte layer 162 is provided on the negative electrode 14, while the positive electrode-side electrolyte layer 161 is not provided on the positive electrode 13. As a matter of course, it is also possible that the positive electrode-side electrolyte layer 161 is provided on the positive electrode 13 and the negative electrode-side electrolyte layer 162 is provided on the negative electrode 14.

In FIGS. 2 to 4, a case is shown, in which the positive electrode-side electrolyte layer 161 is provided on the positive electrode 13 (each of the two positive electrode active material layers 13B) and the negative electrode-side electrolyte layer 162 is provided on the negative electrode 14 (each of the two negative electrode active material layers 14B).

Hereinafter, two kinds of terms "a positive electrode-side electrolyte layer 161" and "a negative electrode-side electrolyte layer 162" are used as required, and the terms "a positive electrode-side electrolyte layer 161" and "a negative electrode-side electrolyte layer 162" are collectively referred to as "an electrolyte layer 16", as required.

The polymeric compound contains at least one type of component selected from a homopolymer and a copolymer.

Specific examples of the homopolymer include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polyvinyl formal, polymethyl methacrylate, polyethyl methacrylate, polyacrylic acid, polymethacrylic acid, polymethyl acrylate, polyethyl acrylate, a styrene-butadiene rubber, a nitrile-butadiene rubber, polystyrene, and polycarbonate.

Among these components, the homopolymer is preferably polyvinylidene fluoride. This is because polyvinylidene fluoride is electrochemically stable.

The copolymer contains at least two types of polymerizable compounds as components thereof. The term "polymerizable compound" is a general term for compounds each containing an unsaturated bond (carbon-carbon double bond).

The wording "a copolymer contains at least two types of polymerizable compounds as components thereof" means that the copolymer is produced using at least two types of raw materials (i.e., monomers) by a polymerization reaction of the at least two types of raw materials.

In detail, a polymerizable compound is a raw material (monomer) for the formation of a copolymer. The polymerizable compound contains an unsaturated bond (a carbon-carbon double bond). Therefore, in the copolymer formation step, the polymerizable compound can cause a polymerization reaction (can be polymerized) utilizing the unsaturated bond (the carbon-carbon double bond) contained in the polymerizable compound.

The type of the polymerizable compound is not particularly limited. Specific examples of the polymerizable compound include vinylidene fluoride, hexafluoropropylene, monomethyl maleate, trifluoroethylene, tetrafluoroethylene and chlorotrifluoroethylene.

The copolymer is, for example, a copolymer containing vinylidene fluoride and hexafluoropyrene as components thereof, or a copolymer containing vinylidene fluoride, hexafluoropropylene and monomethyl maleate as components thereof.

Among these copolymers, the copolymer is preferably a copolymer containing vinylidene fluoride and hexafluoropyrene as components thereof. This is because this copolymer is electrochemically stable.

In the electrolyte layer 16 that is a gel-like electrolyte, the term "solvent" to be contained in the electrolytic solution is a wide-ranging concept including a liquid material, as well as a material having ionic conductivity for dissociating an electrolyte salt. Therefore, in the case where a polymeric compound having ionic conductivity is used, the polymeric compound is also included in the solvent.

The electrolytic solution contains a solvent and an electrolyte salt according to an embodiment. The electrolytic solution may also contain at least one type of component selected from other materials including additives.

The solvent contains at least one type of non-aqueous solvent such as an organic solvent. The electrolytic solution containing a non-aqueous solvent is a so-called non-aqueous electrolytic solution.

Specific examples of the non-aqueous solvent include a carbonic acid ester (a cyclic carbonic acid ester and a chain carbonic acid ester), a lactone, a chain carboxylic acid ester and a nitrile. This is because these solvents enable the achievement of an excellent battery capacity, an excellent cycle property, an excellent storage property and the like. Specific examples of the cyclic carbonic acid ester include ethylene carbonate, propylene carbonate and butylene carbonate, and specific examples of the chain carbonic acid ester include dimethyl carbonate, diethyl carbonate, ethyl methyl carbonate and methyl propyl carbonate. Specific examples of the lactone include γ-butyrolactone and γ-valerolactone. Specific examples of the carboxylic acid ester include methyl acetate, ethyl acetate, methyl propionate, ethyl propionate, methyl butyrate, methyl isobutyrate, methyl trimethylacetate and ethyl trimethylacetate. Specific examples of the nitrile include acetonitrile, glutaronitrile, adiponitrile, methoxyacetonitrile and 3-methoxypropionitrile.

In addition, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate or dimethylsulfoxide. This is because the same advantages can be achieved.

Particularly, the carbonic acid ester preferably includes at least one type of compound selected from ethylene carbonate, propylene carbonate, dimethyl carbonate, diethyl carbonate and ethyl methyl carbonate. This is because a superior battery capacity, a superior cycle property, a superior storage property and the like can be achieved. In this case, a combination of a high-viscosity (high-permittivity) solvent (e.g., relative permittivity $\varepsilon \geq 30$) (e.g., ethylene carbonate and propylene carbonate) and a low-viscosity solvent (e.g., viscosity 1 mPa·s) (e.g., dimethyl carbonate, ethyl methyl carbonate and diethyl carbonate) is more preferred. This is because the dissociability of an electrolyte salt and the mobility of ions can be improved.

Particularly, the non-aqueous solvent preferably includes at least one type of solvent selected from an unsaturated cyclic carbonic acid ester, a halogenated carbonic acid ester, a sulfonic acid ester, an acid anhydride, a dinitrile compound (e.g., dinitrile), a diisocyanate compound, a phosphoric acid ester and the like. This is because the chemical stability of the electrolytic solution can be improved.

The unsaturated cyclic carbonic acid ester refers to a cyclic carbonic acid ester containing at least one unsaturated bond (a carbon-carbon double bond or a carbon-carbon triple bond). When the solvent contains an unsaturated cyclic carbonic acid ester, a coating film derived from the unsaturated cyclic carbonic acid ester is mostly formed on the surface of the negative electrode 14 during charging and discharging, and therefore the occurrence of a reaction of decomposition of the electrolytic solution on the surface of the negative electrode 14 can be prevented.

Specific examples of the unsaturated cyclic carbonic acid ester include vinylene carbonate (1,3-dioxol-2-one), vinyl ethylene carbonate (4-vinyl-1,3-dioxolan-2-one) and methylene ethylene carbonate (4-methylene-1,3-dioxolan-2-one). The content of the unsaturated cyclic carbonic acid ester in the solvent is not particularly limited, and is, for example, 0.01% by weight to 10% by weight.

The halogenated carbonic acid ester refers to a cyclic or chain carbonic acid ester that contains at least one halogen atom as a constituent element thereof. When the solvent contains the halogenated cyclic carbonic acid ester, a coating film derived from halogenated cyclic carbonic acid ester is mostly formed on the surface of the negative electrode 14 during charging and discharging halogenated cyclic carbonic acid ester, and therefore the occurrence of a reaction of decomposition of the electrolytic solution can be prevented on the surface of the negative electrode 14.

Specific examples of the cyclic halogenated carbonic acid ester include 4-fluoro-1,3-dioxolan-2-one and 4,5-difluoro-1,3-dioxolan-2-on. Specific examples of the chain halogenated carbonic acid ester include fluoromethyl methyl carbonate, bis(fluoromethyl) carbonate and difluoromethyl methyl carbonate. The content of the halogenated carbonic acid ester in the solvent is not particularly limited, and is, for example, 0.01% by weight to 50% by weight.

Specific examples of the sulfonic acid ester include 1,3-propanesultone and 1,3-propenesultone. The content of the sulfonic acid ester in the solvent is not particularly limited, and is, for example, 0.5% by weight to 5% by weight.

Specific examples of the acid anhydride include a carboxylic acid anhydride, a disulfonic acid anhydride and a carboxylic acid sulfonic acid anhydride. Specific examples of the carboxylic acid anhydride include succinic anhydride, glutaric anhydride and maleic anhydride. Specific examples of the disulfonic acid anhydride include ethanedisulfonic anhydride and propanedisulfonic anhydride. Specific examples of the carboxylic acid sulfonic acid anhydride include sulfobenzoic anhydride, sulfopropionic anhydride and sulfobutyric anhydride. The content of the acid anhydride in the solvent is not particularly limited, and is, for example, 0.5% by weight to 5% by weight.

The dinitrile compound refers to a compound represented by the formula: NC—$C_mH_{2m}$—CN (wherein m represents an integer of 1 or greater). Specific examples of the dinitrile compound include succinonitrile (NC—$C_2H_4$—CN), glutaronitrile (NC—$C_3H_6$—CN), adiponitrile (NC—$C_4H_8$—CN) and phthalonitrile (NC—$C_6H_4$—CN). The content of the dinitrile compound in the solvent is not particularly limited, and is, for example, 0.5% by weight to 5% by weight.

The diisocyanate compound refers to a compound represented by the formula: OCN—$C_nH_{2n}$—NCO (n represents an integer of 1 or greater). A specific example of the diisocyanate compound is hexamethylene diisocyanate (OCN—$C_6H_{12}$—NCO). The content of the diisocyanate compound in the solvent is not particularly limited, and is, for example, 0.5% by weight to 5% by weight.

Specific examples of the phosphoric acid ester include trimethyl phosphate and triethyl phosphate. The content of the phosphoric acid ester in the solvent is not particularly limited, and is, for example, 0.5% by weight to 5% by weight.

Particularly it is preferred that the non-aqueous solvent is composed of one or both of the unsaturated cyclic carbonic acid ester and the halogenated carbonic acid ester. This is because the occurrence of a reaction of decomposition of the electrolytic solution on the surface of the negative electrode 14 can be prevented effectively due to the presence of a coating film formed on the surface of the negative electrode 14.

The electrolyte salt includes, for example, at least one type of salt such as a lithium salt. The electrolyte salt may also include a salt other than a lithium salt. The salt other than a lithium is, for example, a salt of a light metal other than lithium.

Specific examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). This is because an excellent battery capacity, an excellent cycle property, excellent storage properties and the like can be achieved.

Among these compounds, the lithium salt preferably includes at least one type selected from lithium hexafluorophosphate, lithium tetrafluoroborate, lithium perchlorate and lithium hexafluoroarsenate, and more preferably includes lithium hexafluorophosphate. This is because the internal resistance can be reduced and therefore a higher effect can be achieved.

The content of the electrolyte salt is not particularly limited, and is preferably 0.3 mol/kg to 3.0 mol/kg relative to the amount of the solvent. This is because a high ionic conductivity can be achieved.

The electrolyte layer 16 may further contain at least one type of other material according to an embodiment.

The "other material" is, for example, at least one type of a plurality of inorganic particles. The plurality of inorganic particles primarily serve to improve the safeness of the secondary battery. In detail, when the electrolyte layer 16 contains a plurality of inorganic particles, the separator 15 in the secondary battery is hardly oxidized during charging and discharging, and therefore the short-circuiting between the positive electrode 13 and the negative electrode 14 hardly occurs, resulting in the improvement in safeness of the secondary battery.

The type of the plurality of inorganic particles is not particularly limited. Concretely, the plurality of inorganic particles include at least one type of inorganic material such as a ceramic (insulating material). Specific examples of the ceramic include metal oxides such as aluminum oxide ($Al_2O_3$), zirconium oxide ($ZrO_2$), titanium oxide ($TiO_2$) and magnesium oxide ($MgO_2$). This is because the oxidation of the separator 15 can be prevented satisfactorily and therefore the occurrence of short-circuiting can also be prevented satisfactorily.

The average particle diameter (median diameter D50), the specific surface area (BET specific surface area) and the like of the plurality of inorganic particles are not particularly limited. Concretely, the average particle diameter is, for example, 0.1 μm to 2.5 μm, and the specific surface area is, for example, 0.5 $m^2/g$ to 11 $m^2/g$.

The content of the plurality of inorganic particles in the electrolyte layer 16 is not particularly limited, and therefore can be set arbitrarily.

As shown in FIG. 3, in each of two positive electrode-side electrolyte layers 161, a plurality of through-holes 16K, which extend in the thickness direction of the positive electrode-side electrolyte layers 161 are provided. The through-holes 16K may be formed in only either one of the two positive electrode-side electrolyte layers 161. The number of the through-holes 16K to be provided in one positive electrode-side electrolyte layer 161 may be 1 according to an embodiment.

As shown in FIG. 4, in each of two negative electrode-side electrolyte layers 162, a plurality of through-holes 16K, which extend in a thickness direction of the negative electrode-side electrolyte layers 162 are provided. The through-holes 16K may be formed on only either one of the two negative electrode-side electrolyte layers 162. The number of the through-holes 16K to be provided in one negative electrode-side electrolyte layer 162 may be 1 according to an embodiment.

As mentioned herein, the through-holes 16K are holes that extend in the thickness direction of the electrolyte layer 16 (the positive electrode-side electrolyte layer 161 and the negative electrode-side electrolyte layer 162) and penetrate through the electrolyte layer 16. The term "thickness direction" refers to a vertical direction in each of FIGS. 3 and 4.

More concretely, each of the through-holes 16K is a line of passage that extends from one to the other of two surfaces (a pair of surfaces that face to each other) of the electrolyte layer 16. Therefore, each of the through-holes 16K is not branched to one or more branches and is not communicated with any other one or more through-holes 16K. In other words, when focused on one through-hole 16K, the number of openings (outlets) of the through-hole 16K is only one on one surface and is also only one on the other surface.

The reason why the through-holes 16K are provided in the negative electrode-side electrolyte layer 162 is because the stress due to the expansion of the silicon-based material during charging and discharging can be reduced by the through-holes 16K and therefore a reaction of decomposition of the electrolytic solution is unlikely to occur. Furthermore, the influence due to an unnecessary side reaction during charging and discharging is accumulated in the through-holes 16K and therefore the secondary battery is rarely swollen even when a reaction of decomposition of the electrolytic solution occurs.

In detail, because the silicon-based material is swollen during charging and discharging, the silicon-based material is likely to be broken. If the silicon-based material is broken, a new highly reactive surface is formed and a reaction of decomposition of the electrolytic solution is likely to occur in the new surface. In contrast, when the through-holes 16K are provided in the negative electrode-side electrolyte layer 162, the through-holes 16K serve as spaces for reducing a stress generated as the result of the swelling of the silicon-based material and consequently the silicon-based material becomes unlikely to be broken. As a result, the formation of a new highly reactive surface may rarely occur, and therefore a reaction of decomposition of the electrolytic solution may also rarely occur.

Furthermore, during charging and discharging, the negative electrode active material contained in the negative electrode active material layer 14B can react with the electrolytic solution, and therefore a reaction of decomposition of the electrolytic solution becomes likely to occur. The tendency for the occurrence of a reaction of decomposition of the electrolytic solution is prominent particularly when the negative electrode active material contains a highly reactive silicon-based material. In contrast, when the through-holes 16K are provided in the negative electrode-side electrolyte layer 162, the above-mentioned influence due to the unnecessary side reaction is accumulated in the through-holes 16K even if the negative electrode active material reacts with the electrolytic solution. As a result, the influence due to the unnecessary side reaction hardly reaches parts other than the through-holes 16K and the secondary battery can be rarely swollen.

The reason why the through-holes 16K are provided in the positive electrode-side electrolyte layer 161 is the same as the reason when the through-holes 16K are provided in the negative electrode-side electrolyte layer 162. Namely, it is because a reaction of decomposition of the electrolytic solution is unlikely to occur and the secondary battery is rarely swollen even if a reaction of decomposition of the electrolytic solution occurs.

Particularly, the following configuration is preferred from the viewpoint of the effective prevention of the occurrence of swelling of the secondary battery according to an embodiment.

Firstly, the through-holes 16K are preferably provided in both of two negative electrode-side electrolyte layers 162, rather than provided in either one of the two negative electrode-side electrolyte layers 162. This is because the negative electrode active material layer 14B becomes further unlikely to be swollen.

Secondly, the through-holes 16K are preferably provided in both of two positive electrode-side electrolyte layers 161, rather than provided in either one of the two positive electrode-side electrolyte layers 161. This is because the positive electrode active material layer 13B becomes further unlikely to be swollen.

Thirdly, the through-holes 16K are preferably provided in both of the positive electrode-side electrolyte layer 161 and the negative electrode-side electrolyte layer 162, rather than provided in either one of the positive electrode-side electrolyte layer 161 and the negative electrode-side electrolyte layer 162. This is because the positive electrode active material layer 13B becomes further unlikely to be swollen and the negative electrode active material layer 14B becomes also further unlikely to be swollen.

The details about the requirements for the configuration of the through-holes 16K are, for example, as follows. In the following example, the requirements for the configuration of the through-holes 16K will be described taking through-holes 16K provided in one negative electrode-side electrolyte layer 162 as an example. Provided that the requirements for the configuration of the through-holes 16K described herein are applicable to through-holes 16K provided in one positive electrode-side electrolyte layer 161.

Firstly, the state of extension of the through-holes 16K provided in the negative electrode-side electrolyte layer 162 is not particularly limited, as long as the through-holes 16K extend in the thickness direction, as mentioned above. Particularly, it is preferred that the through-holes 16K extend linearly in the thickness direction. This is because the secondary battery becomes further unlikely to be swollen and the storage/release of lithium becomes unlikely to be inhibited.

In detail, in the case where the through-holes 16K do not extend linearly, in other words, each of the through-holes 16K extends while bending once or more times in the middle thereof, it becomes difficult for a gas generated during an unnecessary side reaction to be released into the outside of the negative electrode-side electrolyte layer 162 through the through-holes 16K. As a result, the gas may be accumulated in the negative electrode-side electrolyte layer 162 and therefore the secondary battery may be swollen, and the storage/release of lithium mediated by the electrolytic solution may be inhibited due to the presence of the gas.

In contrast, in the case where the through-holes 16K extend linearly, in other words, each of the through-holes 16K extends without bending in the middle thereof, a gas generated during an unnecessary side reaction can be released to the outside of the negative electrode-side electrolyte layer 162 through the through-holes 16K easily. As a result, the gas is unlikely to be accumulated in the negative electrode-side electrolyte layer 162 and therefore the secondary battery is rarely swollen, and the storage/release of lithium mediated by the electrolytic solution is rarely inhibited.

Secondly, the positions at which the through-holes 16K are to be provided in the negative electrode-side electrolyte layer 162 are not particularly limited. Particularly it is preferred that the silicon-based material exists in portions of the negative electrode 14 (the negative electrode active material layer 14B) which overlap with the through-holes 16K. This is because, even if an unnecessary side reaction occurs on the surface of the highly reactive silicon-based material, a gas generated during the unnecessary side reaction can be released to the outside of the negative electrode-side electrolyte layer 162 through the through-holes 16K and therefore the secondary battery becomes further unlikely to be swollen.

The wording "portions of the negative electrode active material layer 14B which overlap with the through-holes 16K" refers to portions of the negative electrode active material layer 14B which overlap with the through-holes 16K. In other words, in the case where the carbon material and the silicon-based material are contained in the negative electrode active material layer 14B, it is preferred that the through-holes 16K are located at such positions that the through-holes 16K overlap with the silicon-based material.

Thirdly, the number of the through-holes 16K provided in the negative electrode-side electrolyte layer 162 is not particularly limited, as long as the number is 1 or more. Particularly, the number of the through-holes 16K is preferably 2 or more, and is more preferably as much as possible as long as the normal charging/discharging of the secondary battery cannot be affected. This is because the negative electrode active material layer 14B becomes unlikely to be swollen.

The determination of the number of the through-holes 16K can be made by observing the surface of the negative electrode-side electrolyte layer 162 with at least one type of microscope such as an optical microscope, for example. In a microscopic image obtained by the observation of the surface of the negative electrode-side electrolyte layer 162, the through-holes 16K are observed as circular regions. Therefore, the determination of the number (total number) of the through-holes 16K can be performed by counting the number of the circular regions.

The "circular regions" refer to approximately circular region that can be observed in the microscopic image. The shape defined by the outer periphery (i.e., the shape of the outline) of each of the circular regions may be approximately circular, and is not therefore limited to a true circle. Namely, the shape of the outline is not particularly limited, as long as the outline includes a curved line. The shape of the outline may be an oval shape, or may be any other shape. In the microscopic image, the color of the inside of each of the circular regions is a pale color (a color relatively close to white color), while the color of a region outside the circular regions is a dark color (a color relatively close to black color). Therefore, the presence or absence of the circular regions can be confirmed visually on the basis of the difference in color density (color contrast). It should be noted that, besides regions each of which is observed in a pale color entirely, the circular regions also include some circular regions each of which is visualized in a ring-like (or crater-like) shape because the color of only a region excluding the center part in each of the circular regions is in a pale color. The positional darkness/paleness relation (in which the color of the inside of each of the circular regions is a pale color, while the color of the region outside the circular regions is a dark color) may be vice versa.

Fourth, the number, per unit area, of the through-holes 16K provided in the negative electrode-side electrolyte layer 162 is not particularly limited. Particularly, the number of the through-holes 16K per unit area of the negative electrode-side electrolyte layer 162 is preferably 1 hole/cm$^2$ to 100 holes/cm$^2$. This is because the number of the through-holes 16K is optimized and therefore the negative electrode active material layer 14B becomes unlikely to be swollen while retaining the battery capacity and the like thereof.

The determination of the number of the through-holes 16K per unit area can be carried out by, for example, determining the number (total number) of the through-holes 16K in an arbitrary observation area by the same procedure as the above-mentioned procedure employed for the determination of the number of the through-holes 16K, and then dividing the total number (holes) of the through-holes 16K by the area (cm$^2$) of the observation area. Namely, a value represented by the equation: (the number of the through-holes 16K per unit area (holes/cm$^2$))=(the total number of the through-holes 16K (holes))/(area of the observation area (cm$^2$)). The observation area is not particularly limited, and is, for example, an arbitrary area defined by 46 cm×4 cm.

Fifth, as mentioned above, in the case where the through-holes 16K are observed as circular regions in the observation of the surface of the negative electrode-side electrolyte layer 162, the average diameter of the through-holes 16K is not particularly limited. Particularly, the average diameter of the through-holes 16K is preferably 0.02 mm to 2 mm. This is because the average diameter of the through-holes 16K is optimized and therefore the negative electrode active material layer 14B becomes unlikely to be swollen while retaining the battery capacity and the like thereof. In the case where the shapes of the circular regions are oval or the like, the diameter of each of the circular regions means the longest diameter of the circular region.

The determination of the average diameter of the through-holes 16K can be performed by observing the surface of the negative electrode-side electrolyte layer 162 in an arbitrary observation area by the same procedure as the above-mentioned procedure employed for the determination of the number of the through-holes 16K to measure the diameters (mm) of the through-holes 16K (circular regions) and then calculating an average value of the diameters. The requirements for the observation area are, for example, the same as those employed for the determination of the number of the through-holes 16K per unit area.

The secondary battery can be operated, for example, in the following manner according to an embodiment.

During charging, lithium ions are released from the positive electrode 13, and the lithium ions are stored in the negative electrode 14 through the electrolyte layer 16. On the other hand, during discharging, lithium ions are released from the negative electrode 14, and the lithium ions are stored in the positive electrode 13 through the electrolyte layer 16.

A secondary battery equipped with an electrolyte layer 16 can be produced, for example, by any one of the following three kinds of processes according to an embodiment.

In the first process, a positive electrode 13 and a negative electrode 14 are produced, then an electrolyte layer 16 is formed, and then a secondary battery is assembled in the below-mentioned manner, for example. The procedures for the production of the positive electrode 13 and the negative electrode 14 mentioned in the first process are the same as the below-mentioned procedures to be employed for the production in the second process and the third process.

For the production of the positive electrode 13, first a positive electrode active material is mixed with a positive electrode binder, a positive electrode conducting agent and the like to produce a positive electrode mix. Subsequently, the positive electrode mix is dispersed or dissolved in an organic solvent to produce a paste-like positive electrode mix slurry. Finally, the positive electrode mix slurry is applied onto both surfaces of a positive electrode current collector 13A, and then the positive electrode mix slurry is dried to form positive electrode active material layers 13B. Subsequently, the positive electrode active material layers 13B may be compression-molded with a roll pressing machine or the like. In this case, the compression molding may be carried out while heating the positive electrode active material layers 13B, or the compression-molding may be repeated a plurality of times.

For the production of the negative electrode 14, negative electrode active material layers 14B are formed respectively on both surfaces of a negative electrode current collector 14A by the same procedure as the above-mentioned procedure employed for the production of the positive electrode 13. Concretely, a negative electrode mix prepared by mixing a negative electrode active material (containing a carbon material and a silicon-based material) with a negative electrode binder, a negative electrode conducting agent and the like is dispersed or dissolved in an organic solvent or the like to produce a paste-like negative electrode mix slurry. Subsequently, the negative electrode mix slurry is applied onto both surfaces of the negative electrode current collector 14A and is then dried to form negative electrode active material layers 14B, and then the negative electrode active material layers 14B are optionally compression-molded with a roll pressing machine or the like. If necessary, after the formation of the negative electrode active material layers 14B, the negative electrode active material layers 14B may be heat-treated.

For the formation of electrolyte layers 16, firstly an electrolyte salt and the like are dissolved in a solvent to prepare an electrolytic solution. Subsequently, the electrolytic solution, a polymeric compound and optionally a plurality of inorganic particles and a diluent solvent (e.g., an organic solvent) and the like are mixed together, and then the resultant mixture is stirred to prepare a sol-like precursor solution. Finally, the precursor solution is applied onto the surfaces of the positive electrode 13 (the positive electrode active material layers 13B) with a coating machine, and then the precursor solution is dried to form gel-like electrolyte layers 16 (positive electrode-side electrolyte layers 161). The precursor solution is also applied onto the surfaces of the negative electrode 14 (the negative electrode active material layers 14B) with a coating machine and then the precursor solution is dried to form gel-like electrolyte layers 16 (negative electrode-side electrolyte layers 162).

For the formation of the electrolyte layers 16, through-holes 16K are formed by adjusting conditions such as a speed of application of the precursor solution, for example Concretely, when the speed of application of the precursor solution is increased, it becomes easy to form through-holes 16K. In contrast, when the speed of application of the precursor solution is deceased, it becomes difficult to form the through-holes 16K.

In this case, the number of the through-holes 16K per unit area (holes/cm$^2$) is controlled, for example, by adjusting a condition such as the speed of application of the precursor solution. Concretely, for example, the number of the through-holes 16K per unit area is increased by increasing the speed of application of the precursor solution, and the number of the through-holes 16K per unit area is decreased by decreasing the speed of application of the precursor solution. The number of the through-holes 16K can also be controlled in the same manner as mentioned above.

The average diameter (mm) of the through-holes 16K can be controlled by adjusting a condition such as the content of the polymeric compound in the precursor solution. Concretely, for example, the average diameter of the through-holes 16K is increased by increasing the content of the polymeric compound in the precursor solution, and the average diameter of the through-holes 16K is decreased by decreasing the content of the polymeric compound in the precursor solution.

For the formation of the electrolyte layers 16 (the negative electrode-side electrolyte layers 162) each having the through-holes 16K formed therein, a method as mentioned below may also be employed.

Firstly, in the step for producing a negative electrode 14, a foaming agent is adhered onto the surface of the silicon-based material by, for example, grinding a powder of the silicon-based material with a powder of the foaming agent with a mortar. The type of the foaming agent is not particularly limited, and is, for example, at least one type of azodicarbonamide and hydrazodicarbonimide.

Subsequently, the negative electrode 14 is produced in the same manner as the above-mentioned procedure, except that the silicon-based material having the foaming agent adhered onto the surface thereof is used. In this procedure for producing the negative electrode 14, the foaming agent adhered onto the surface of the silicon-based material is likely to almost disappear through the drying process of negative electrode mix slurry, the heat treatment process of the negative electrode active material layers 14B, and the like. However, it becomes possible to allow a decomposition product of the foaming agent to remain on the surface of the silicon-based material by, for example, adjusting the temperature of the heat treatment of the negative electrode active material layer 14B, or the like.

Finally, after the decomposition product of the foaming agent is allowed to remain on the surface of the silicon-based material, the negative electrode-side electrolyte layers 162 are formed by the above-mentioned procedure. In this case, when a fluorine-containing lithium salt such as lithium hexafluorophosphate is contained in an electrolytic solution, free hydrogen fluoride (HF) derived from the fluorine-containing lithium salt is generated during the process for drying a precursor solution, and the hydrogen fluoride reacts with the residue of the foaming agent. As a result, a gas (carbon dioxide) resulting from the reaction of hydrogen fluoride with the residue of the foaming agent is generated in the vicinity of the silicon-based material, whereby through-holes 16K are formed.

When the above-mentioned method using a foaming agent is employed, the formation of the through-holes 16K so as to extend linearly in the thickness direction is likely to occur. Furthermore, because the through-holes 16K are formed in the vicinity of the silicon-based material, the silicon-based material is likely to be present in portions of the negative electrode 14 (the negative electrode active material layers 14B) which overlap with the through-holes 16K.

For the assembly of a secondary battery, firstly, a positive electrode lead 11 is attached to the positive electrode current collector 13A by a welding method or the like, and a negative electrode lead 12 is attached to the negative electrode current collector 14A by a welding method or the like. Subsequently, the positive electrode 13 and the negative electrode 14, which are laminated with a separator 15 and the electrolyte layers 16 interposed therebetween, are wound to produce a wound electrode body 10. Subsequently, a protection tape 17 is adhered onto the outermost periphery of the wound electrode body 10. Finally, an external packaging member 20 is folded so as to sandwich the wound electrode body 10 therebetween, and then the outer peripheral edges of the external packaging member 20 are bonded to each other by a thermal bonding method or the like to enclose the wound electrode body 10 in the external packaging member 20. In this case, an adhesion film 21 is inserted between the positive electrode lead 11 and the external packaging member 20, and the adhesion film 21 is also inserted between the negative electrode lead 12 and the external packaging member 20.

In the second process, a positive electrode lead 11 is attached to the positive electrode 13, and a negative electrode lead 12 is attached to the negative electrode 14. Subsequently, the positive electrode 13 and the negative electrode 14, which are laminated on each other with a separator 15 interposed therebetween, are wound to produce a wound body that is a precursor of a wound electrode body 10. Subsequently, a protection tape 17 is adhered onto the outermost periphery of the wound body. Subsequently, an external packaging member 20 is folded so as to sandwich the wound body therebetween, and then outer peripheral edges of the external packaging member 20 are bonded to each other by a thermal bonding method or the like to house the wound body in the external packaging member 20. Subsequently, an electrolytic solution, a monomer that is a raw material for a polymeric compound, a polymerization initiator, and optionally other materials such as a plurality of inorganic particles and a polymerization inhibitor are mixed together to prepare an electrolyte composition. Subsequently, the electrolyte composition is injected into a bag-shaped external packaging member 20, and then the external packaging member 20 is sealed by a thermal bonding method or the like. Subsequently, the monomer is polymerized to form the polymeric compound. As a result, the polymeric compound is impregnated with the electrolytic solution and the polymeric compound is gelled, thereby forming electrolyte layers 16. In this second process, negative electrode-side electrolyte layers 162 each having through-holes 16K formed therein can be formed by, for example, the method described herein using a foaming agent according to an embodiment.

In the third process, a wound body is produced by the same procedures as those in the second process, except that a separator 15 having a porous membrane (a base layer) and polymeric compound layers formed on the both surfaces of the porous membrane is used. Subsequently, the wound body is housed in a bag-shaped external packaging member 20. For the formation of the polymeric compound layers, a solution prepared by dissolving a polymeric compound in an organic solvent or the like is applied onto both surfaces of the separator 15 and then the solution is dried. Subsequently, an electrolytic solution is injected into the external packaging member 20, and then an opening of the external packaging member 20 is sealed by a thermal bonding method or the like. Subsequently, the external packaging member 20 is heated while applying a load to the external packaging member 20, thereby adhering the separator 15 to the positive electrode 13 and the negative electrode 14 with the polymeric compound layers interposed therebetween. As a result, the polymeric compound in the polymeric compound layers is impregnated with the electrolytic solution and the polymeric compound is gelled, thereby forming electrolyte layers 16. In this third process, negative electrode-side electrolyte layers 162 each having through-holes 16K formed therein can be formed by the method described herein using a foaming agent according to an embodiment.

In the third process, the swelling of the secondary battery can be suppressed more effectively compared with the first process. Furthermore, in the third process, compared with the second process, the monomer that is a raw material for the polymeric compound, the solvent or the like remains in the electrolyte layers 16 in little amount, and therefore the process of the formation of the polymeric compound can be controlled satisfactorily. As a result, the positive electrode 13, the negative electrode 14 and the separator 15 can be adhered to the electrolyte layers 16 satisfactorily.

In the secondary battery, the negative electrode 14 contains a carbon material and a silicon-based material, and the electrolyte layers 16, each of which is a gel-like electrolyte, has one or more through-holes 16K extending in the thickness direction thereof.

In this case, as mentioned above, a stress resulting from the expansion of the silicon-based material during charging and discharging can be reduced by the through-holes 16K, and therefore a reaction of decomposition of the electrolytic solution is unlikely to occur. Furthermore, because the influence due to an unnecessary side reaction during charging and discharging is accumulated in the through-holes 16K, the secondary battery becomes unlikely to be swollen even if a reaction of decomposition of the electrolytic solution occurs. Therefore, excellent battery properties can be achieved.

Particularly, when the through-holes 16K extend linearly in the thickness direction, a gas generated during an unnecessary side reaction can be released to the outside of the electrolyte layers 16 through the through-holes 16K easily and therefore the gas is unlikely to be accumulated in the electrolyte layers 16. Therefore, the secondary battery becomes further unlikely to be swollen and the storage/release of lithium is unlikely to be inhibited, and therefore a higher effect can be achieved.

In addition, when the silicon-based material is present in portions of the negative electrode active material layers 14B which overlap with the through-holes 16K, a gas generated during an unnecessary side reaction can be released to the outside of the electrolyte layers 16 through the through-holes 16K easily even if an unnecessary side reaction occurs in the surface of the silicon-based material. Therefore, the secondary battery becomes further unlikely to be swollen and a higher effect can be achieved.

Furthermore, when the number of the through-holes 16K per unit area is 1 hole/cm$^2$ to 100 holes/cm$^2$, the secondary battery becomes further unlikely to be swollen, and therefore a higher effect can be achieved.

Furthermore, when the average diameter of the through-holes 16K is 0.02 mm to 2 mm, the secondary battery becomes further unlikely to be swollen, and therefore a higher effect can be achieved.

When each of the electrolyte layers 16 (the positive electrode-side electrolyte layers 161) provided on the positive electrode 13 has one or more through-holes 16K and each of the electrolyte layers 16 (the negative electrode-side electrolyte layers 162) provided on the negative electrode 14 has one or more through-holes 16K, the secondary battery becomes further unlikely to be swollen, and therefore a higher effect can be achieved.

Furthermore, when each of the electrolyte layers 16 contains a plurality of inorganic particles, safeness can be improved, and therefore a higher effect can be achieved. In this case, a higher effect can be achieved when each of the plurality of inorganic particles contains aluminum oxide or the like.

Next, examples of the application of the above-mentioned secondary battery will be described.

The use applications of the secondary battery are not particularly limited, and include a machine, a device, a tool, an apparatus and a system (i.e., an assembly of a plurality of devices) as long as the secondary battery is used as a power supply for driving purposes, an electric power storage source for electric power reservation purposes or the like. When used as a power supply, the secondary battery may be a main power supply or an auxiliary power supply. The main power supply is a power supply that is used preferentially regardless of the presence or absence of other power supply. The auxiliary power supply may be, for example, a power supply that can be used in place of a main power supply or a power supply that can be switched from a main power supply as required. In the case where the secondary battery is used as an auxiliary power supply, the type of a main power supply is not limited to a secondary battery.

The use applications of the secondary battery include the followings: an electronic device (including a mobile electronic device), such as a video camera, a digital still camera, a mobile phone, a note-type personal computer, a cordless phone, a headset stereo, a mobile radio, a mobile television and a personal digital assistant; a mobile daily instrument such as an electric shaver; a storage device such as a backup power supply and a memory card; an electric power tool such as an electric drill and a power saw; a battery pack that is installed as a removable power supply in a note-type personal computer or the like; a medical electronic device such as a pacemaker and a hearing aid; an electric vehicle such as an electric car (including a hybrid car); and an electric power storage system for accumulating an electric power for emergencies and the like, such as a battery system for home use. As a matter of course, the use application of the secondary battery may be other than the use applications described herein.

Particularly, the secondary battery can be used effectively in a battery pack, an electric vehicle, electric power storage system, an electric power tool, an electronic device and the like. In these use applications, excellent battery properties are required. Therefore, the performance of these products can be improved effectively by using the secondary battery according to an embodiment the present technology. A battery pack is a power supply equipped with a secondary battery. The battery pack may be equipped with a unit battery or an assembled battery, as mentioned below. An electric vehicle is a vehicle that can be operated (run) using a secondary battery as a driving power supply, and may be an automobile that is also equipped with a driving source other than a secondary battery (e.g., a hybrid car), as mentioned herein. An electric power storage system is a system in which a secondary battery is used as an electric power storage source. For example, in an electric power storage system for home use, an electric power is accumulated in a secondary battery that serves as an electric power storage source. Therefore, the electric power storage system for home use can be used as an electric appliance for home use or the like by utilizing the electric power. An electric power tool is a tool in which a movable unit (e.g., a drill) is driven utilizing a secondary battery as a driving power supply. An electronic device is a device that can exert various functions thereof by utilizing a secondary battery as a driving power supply (an electric power supply source).

Hereinbelow, some use applications of the secondary battery will be described concretely. The configurations of the application examples described herein are intended only as illustrations, and the configurations can be varied as required.

Figure 5:
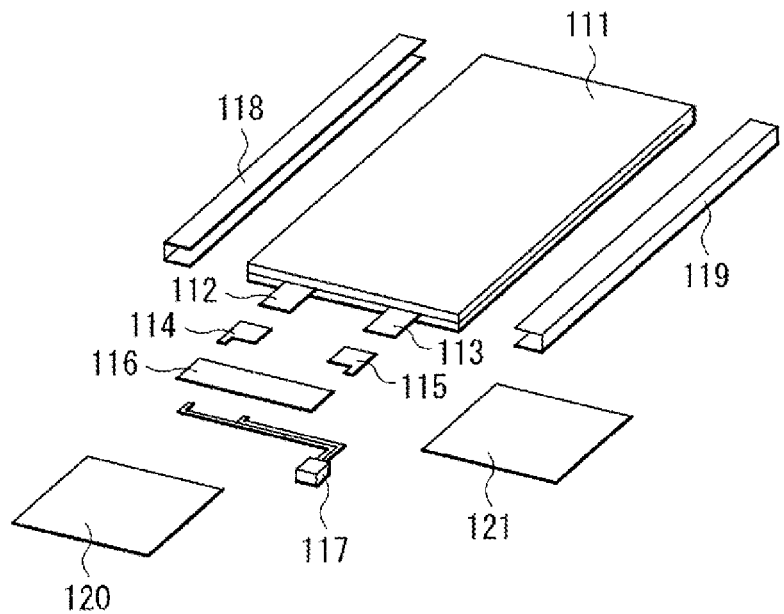
FIG. 5 is a perspective view illustrating the configuration of an application example (a battery pack: a unit battery) of the secondary battery according to an embodiment of the present technology.
Figure 6:
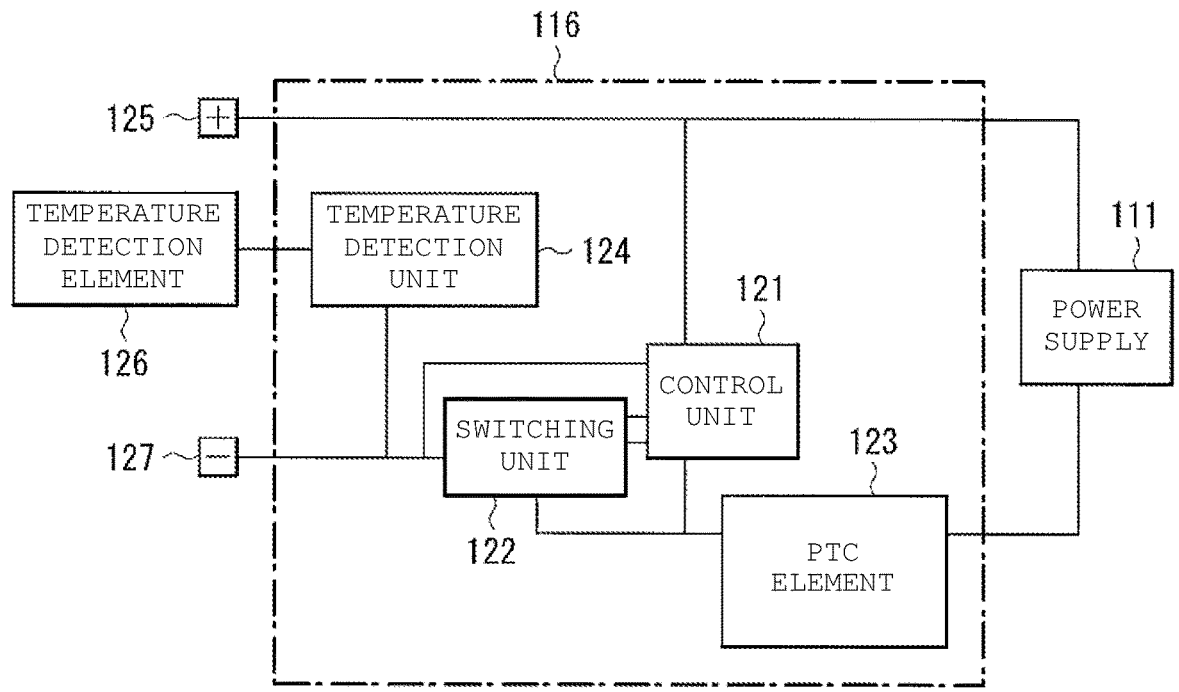
FIG. 6 is a block diagram illustrating the configuration of the battery pack shown in FIG. 5 according to an embodiment of the present technology.

FIG. 5 is a perspective configuration diagram of a battery pack equipped with a unit battery according to an embodiment. FIG. 6 is a block configuration diagram of the battery pack shown in FIG. 5 according to an embodiment. In FIG. 5, a state where a battery pack is disassembled is shown.

The battery pack described herein is a simplified battery pack (i.e., a soft pack) equipped with a single secondary battery according to the present technique, and can be installed in an electronic device typified by a smart phone. As shown in FIG. 5, the battery pack is equipped with, for example: a power supply 111 that is a laminate film-type secondary battery and a circuit board 116 connected to the power supply 111. To the power supply 111, a positive electrode lead 112 and a negative electrode lead 113 are attached.

At both side surfaces of the power supply 111, a pair of adhesive tapes 118 and 119 are respectively adhered. On the circuit board 116, a protection circuit module (PCM) is formed. The circuit board 116 is connected to a positive electrode lead 112 via a tab 114, and is also connected to a negative electrode lead 113 via a tab 115. The circuit board 116 is connected to a connector-attached wire lead 117 for external connection. In the state where the circuit board 116 is connected to the power supply 111, the circuit board 116 is protected by a label 120 and an insulating sheet 121. By adhering the label 120, the circuit board 116, the insulating sheet 121 and the like are fixed.

The battery pack is also equipped with, for example, a power supply 111 and a circuit board 116, as shown in FIG. 6. The circuit board 116 is also equipped with, for example, a control unit 121, a switching unit 122, a PTC element 123 and a temperature detection unit 124. The power supply 111 can be connected to the outside through a positive electrode terminal 125 and a negative electrode terminal 127, and therefore the power supply 111 can be charged and discharged through the positive electrode terminal 125 and the negative electrode terminal 127. The temperature detection unit 124 can detect a temperature using a temperature detection terminal (a so-called T terminal) 126.

The control unit 121 controls the entire operation of the battery pack (including the state of usage of the power supply 111). The control unit 121 includes, for example, a central processing unit (e.g., a CPU), a memory and the like according to an embodiment.

When, for example, the battery voltage reaches an overcharge detection voltage, the control unit 121 disconnects the switching unit 122 so that a charge current cannot flow into the current passage of the power supply 111. When, for example, a high current flows during charging, the control unit 121 disconnects the switching unit 122 so as to shut off a charge current.

On the other hand, when, for example, the battery voltage reaches an overdischarge detection voltage, the control unit 121 disconnects the switching unit 122 so that a discharge current cannot flow into the current passage of the power supply 111. When, for example, a high current flows during discharging, the control unit 121 disconnects the switching unit 122 so as to shut off a discharge current.

The overcharge detection voltage is, for example, 4.2 V±0.05 V and the overdischarge detection voltage is, for example, 2.4 V±0.1 V.

The switching unit 122 switches the state of usage of the power supply 111, i.e., the connection or disconnection of the power supply 111 with an external device, in response to a command from the control unit 121. The switching unit 122 includes, for example, a charge control switch, a discharge control switch and the like as components thereof. Each of the charge control switch and the discharge control switch is, for example, a semiconductor switch such as a field effect transistor equipped with a metal oxide semiconductor (e.g., a MOSFET). The charge-discharge current can be detected, for example, on the basis of the ON resistance of the switching unit 122.

The temperature detection unit 124 measures the temperature of the power supply 111 and outputs the measurement result of the temperature to the control unit 121. The temperature detection unit 124 includes, for example, a temperature detection element such as a thermistor as a component thereof. In the case where the control unit 121 performs a charge-discharge control upon the occurrence of abnormal heating, the measurement result of the temperature measured by the temperature detection unit 124 is used for the correction processing by the control unit 121 in the calculation of a remaining capacity and the like.

Alternatively, the circuit board 116 may not be equipped with a PTC element 123. In this case, the PTC element may be attached to the circuit board 116 separately.

Figure 7:
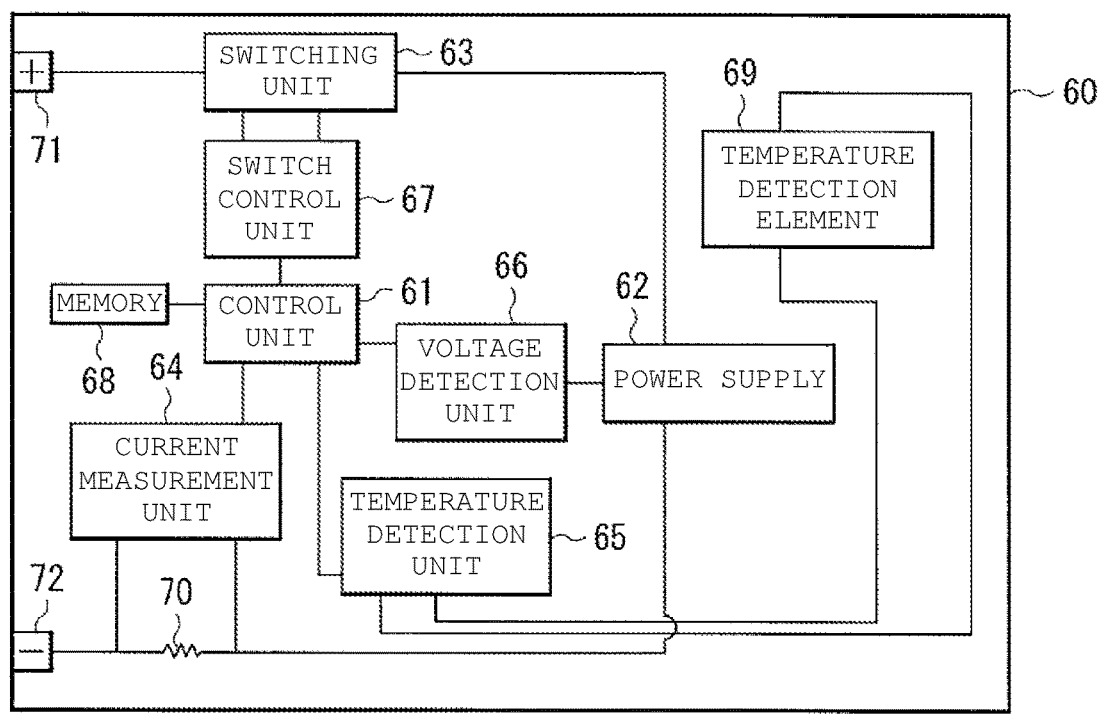
FIG. 7 is a block diagram illustrating the configuration of an application example (a battery pack: an assembled battery) of the secondary battery according to an embodiment of the present technology.

FIG. 7 shows the block configuration diagram of a battery pack equipped with an assembled battery according to an embodiment.

The battery pack is equipped with, for example: a housing 60; and a control unit 61, a power supply 62, a switching unit 63, a current measurement unit 64, a temperature detection unit 65, a voltage detection unit 66, a switch control unit 67, a memory 68, a temperature detection element 69, a current detection resistor 70, a positive electrode terminal 71 and a negative electrode terminal 72 all of which are housed in the housing 60. The housing 60 contains, for example, a plastic material.

The control unit 61 can control the entire operation of the battery pack (including the state of usage of the power supply 62). The control unit 61 includes, for example, a CPU or a processor as a component thereof. The power supply 62 is an assembled battery including at least two types of secondary batteries according to the present technique, and the mode of connection between the at least two types of secondary batteries may be in series, or in parallel or a mixed state thereof. In one example, the power supply 62 includes six secondary batteries that are connected to one another in a (2 in parallel)×(3 in series) form.

The switching unit 63 switches the state of usage of the power supply 62, i.e., the connection or disconnection of the power supply 62 with an external device, in response to the command from the control unit 61. The switching unit 63 is equipped with, for example, a charge control switch, a discharge control switch, a charging diode and a discharging diode. Each of the charge control switch and the discharge control switch is, for example, a semiconductor switch such as a field effect transistor equipped with a metal oxide semiconductor (e.g., a MOSFET).

The current measurement unit 64 measures a current using the current detection resistor 70, and outputs the measurement result of the current to the control unit 61. The temperature detection unit 65 measures a temperature using the temperature detection element 69, and outputs the measurement result of the temperature to the control unit 61. In the case where the control unit 61 performs a charge-discharge control upon the occurrence of abnormal heating, the measurement result of the temperature is used for the correction processing by the control unit 61 in the calculation of a remaining capacity and the like. The voltage detection unit 66 measures a voltage of the secondary battery in the power supply 62, and supplies the measurement result of the voltage, which is analogue-digital converted, to the control unit 61.

The switch control unit 67 controls the operation of the switching unit 63 depending on signals respectively input from the current measurement unit 64 and the voltage detection unit 66.

When, for example, the battery voltage reaches an overcharge detection voltage, the switch control unit 67 disconnects the switching unit 63 (the charge control switch) so that a charge current cannot flow in the current passage in the power supply 62. As a result, in the power supply 62, only discharging through the discharging diode becomes possible. When, for example, a high current flows during charging, the switch control unit 67 shuts off the charge current.

When, for example, the battery voltage reaches an overdischarge detection voltage, the switch control unit 67 disconnects the switching unit 63 (the discharge control switch) so that a discharge current cannot flow in the current passage in the power supply 62. As a result, in the power supply 62, only charging through the charging diode becomes possible. When, for example, a high current flows during discharging, the switch control unit 67 shuts off the discharge current.

The overcharge detection voltage is, for example, 4.2 V±0.05 V, and the overdischarge detection voltage is, for example, 2.4 V±0.1 V.

The memory 68 includes, for example, an EEPROM that is a non-volatile memory. In the memory 68, a numerical value calculated by the control unit 61, information on the secondary batteries which is measured in the production process (e.g., an internal resistance in an initial state), and the like are stored. By storing a full charge capacity of each of the secondary batteries in the memory 68, it becomes possible for the control unit 61 to know information such as a remaining capacity.

The temperature detection element 69 measures the temperature of the power supply 62, and outputs the measurement result of the temperature to the control unit 61. The temperature detection element 69 contains, for example, a thermistor.

Each of the positive electrode terminal 71 and the negative electrode terminal 72 is a terminal that can be connected to an external device capable of being driven with a battery pack (e.g., a note-type personal computer), an external device used for charging a battery pack (e.g., a charger) or the like. The power supply 62 can be charged and discharged through the positive electrode terminal 71 and the negative electrode terminal 72.

Figure 8:
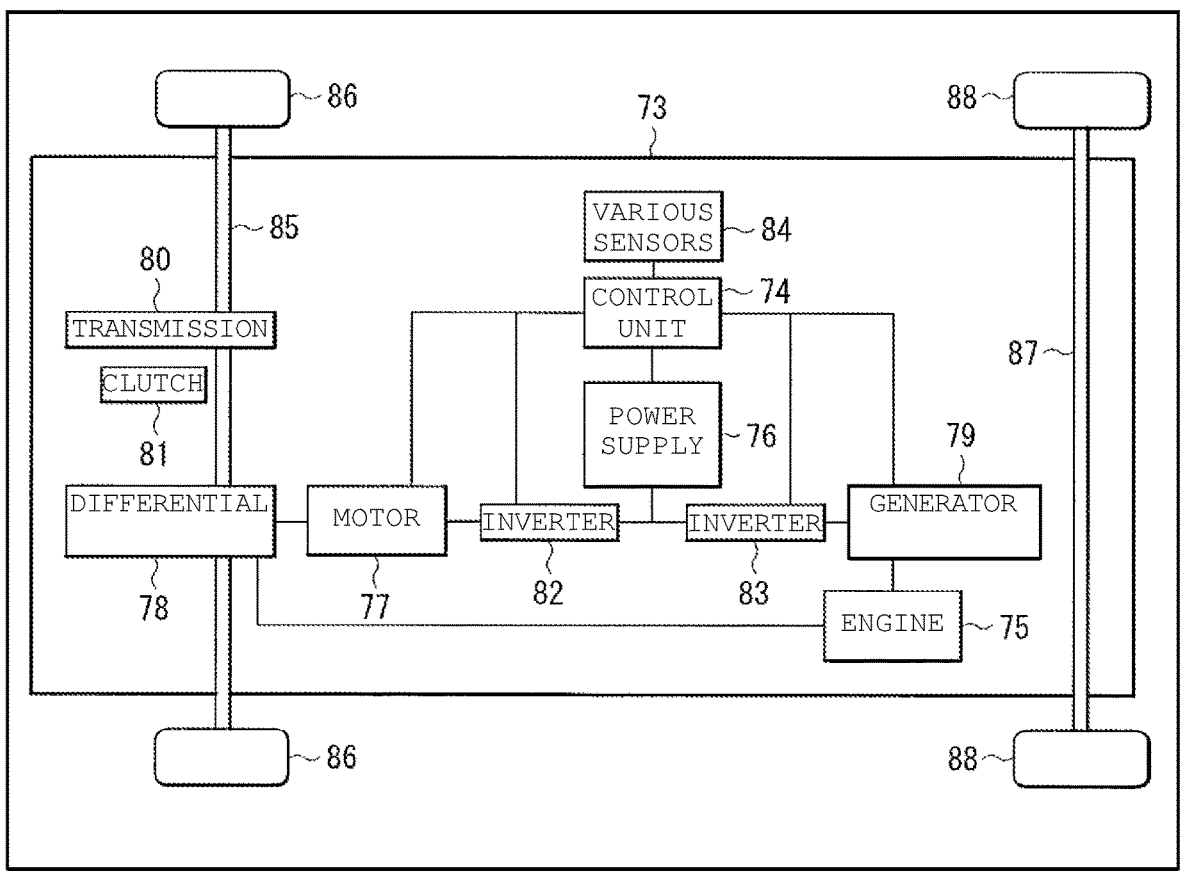
FIG. 8 is a block diagram illustrating the configuration of an application example (an electric vehicle) of the secondary battery according to an embodiment of the present technology.

FIG. 8 shows a block configuration diagram of a hybrid car that is one example of an electric vehicle according to an embodiment.

The electric vehicle is equipped with, for example: a metal-made housing 73; and a control unit 74, an engine 75, a power supply 76, a driving motor 77, a differential 78, a generator 79, a transmission 80, a clutch 81, inverters 82 and 83, and various sensors 84 all of which are housed in the housing 73. In addition, the electric vehicle is also equipped with, for example, a front wheel drive shaft 85 and front wheels 86, which are connected to the differential 78 and the transmission 80, and rear wheel drive shaft 87 and rear wheels 88.

The electric vehicle can run by utilizing either one of the engine 75 and the motor 77 as a driving source. The engine 75 is a main power source, such as a gasoline engine. In the case where the engine 75 is used as a power source, a driving force (rotational force) of the engine 75 is transmitted to the front wheels 86 and the rear wheels 88 through the differential 78, the transmission 80 and the clutch 81 which are driving units, for example. The rotational force of the engine 75 is transmitted to the generator 79, and therefore the generator 79 generates an alternating-current power utilizing the rotational force. The alternating-current power is converted to a direct-current power through the inverter 83, and therefore the direct-current power is accumulated in the power supply 76. On the other hand, in the case where the motor 77, which is a conversion unit, is used as a power source, an electric power (direct current electric power) supplied from the power supply 76 is converted to an alternating-current power through the inverter 82, and therefore the motor 77 is driven utilizing the alternating-current power. A driving force (rotational force) converted from the electric power by the motor 77 is transmitted to the front wheels 86 and the rear wheels 88 through the differential 78, the transmission 80 and the clutch 81 which are driving units, for example.

When the electric vehicle is deaccelerated through a damping mechanism, a resisting force generated during the deacceleration is transmitted to the motor 77 as a rotational force. Therefore, it is also possible to generate an alternating-current power by the motor 77 by utilizing the rotational force. The alternating-current power is converted to a direct-current power through the inverter 82, and therefore it is preferred for the direct-current regenerative electric power to be accumulated in the power supply 76.

The control unit 74 controls the entire operation of the electric vehicle. The control unit 74 is equipped with, for example, a CPU or a processor. The power supply 76 is equipped with at least one type of secondary battery according to the present technique. It is also possible that the power supply 76 is connected to an external power supply and receives the supply of an electric power from the external power supply so as to accumulate the electric power therein. The various sensors 84 are used, for example, for controlling the rotating speed of the engine 75 and also controlling the opening angle of a throttle valve (throttle opening angle). The various sensors 84 include, for example, at least one type of sensor selected from a speed sensor, an acceleration sensor and an engine rotating speed sensor.

In this section, a case where the electric vehicle is a hybrid car is exemplified. However, the electric vehicle may be a vehicle that can be driven only by the power supply 76 and the motor 77 without the need to utilize the engine 75 (i.e., an electric car).

Figure 9:
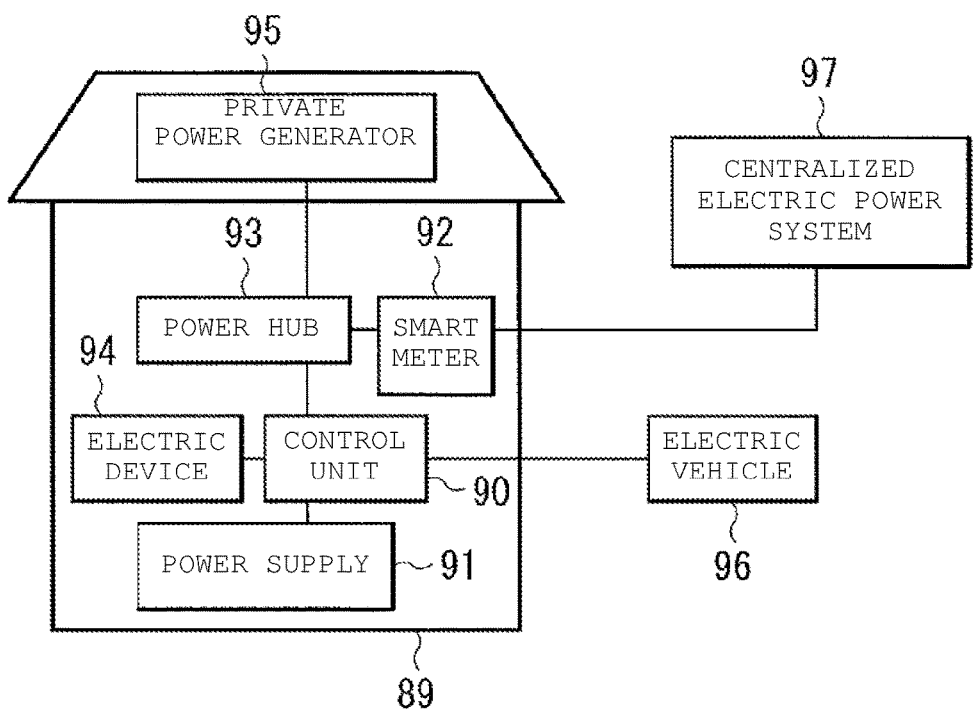
FIG. 9 is a block diagram illustrating the configuration of an application example (an electric power storage system) of the secondary battery according to an embodiment of the present technology.

FIG. 9 shows a block configuration diagram of an electric power storage system according to an embodiment.

The electric power storage system is equipped with, for example: a house 89 such as a general residence and a commercial building; and a control unit 90 including a processor or the like, a power supply 91, a smart meter 92 and a power hub 93 all of which are housed in the house 89.

In the electric power storage system, it is possible, for example, that the power supply 91 is connected to an electric device 94 that is placed in the house 89 and is also connected to an electric vehicle 96 that is parked at the outside of the house 89. Alternatively, it is also possible, for example, that the power supply 91 is connected to a private power generator 95 that is placed in the house 89 through the power hub 93 and is also connected to an external centralized electric power system 97 through the smart meter 92 and the power hub 93.

The electric device 94 also includes at least one type of home appliance such as a refrigerator, an air conditioner, a television and a water heater. The private power generator 95 includes, for example, at least one type of power generator selected from a solar power generator, a wind power generator and the like. The electric vehicle 96 includes, for example, at least one type of electric vehicle selected from an electric car, an electric motorcycle and a hybrid car. The centralized electric power system 97 includes, for example, at least one type of electric power system selected from a thermal power plant, a nuclear power plant, a hydroelectric power plant and a wind power plant.

The control unit 90 controls the entire operation of the electric power storage system (including the state of usage of the power supply 91). The control unit 90 includes, for example, a CPU. The power supply 91 includes at least one type of secondary battery according to the present technique. The smart meter 92 is, for example, a network-compatible electric power meter to be placed in the house 89 on power demand side, and can communicate with power supply side. Therefore, the smart meter 92 controls the demand-supply balance of an electric power in the houses 89 while communicating with an outside to thereby enable the highly efficient and steady energy supply, for example.

In the electric power storage system, an electric power from the centralized electric power system 97, which is an external power supply, is accumulated in the power supply 91 through the smart meter 92 and the power hub 93, and an electric power from the private power generator 95, which is an independent power supply, is accumulated in the power supply 91 through the power hub 93. The electric power accumulated in the power supply 91 is supplied to the electric device 94 and the electric vehicle 96 in response to a command from the control unit 90. As a result, the electric device 94 becomes in an operable state and the electric vehicle 96 becomes in a chargeable state. Namely, the electric power storage system is a system that enables the accumulation and supply of an electric power in the house 89 by utilizing the power supply 91.

The electric power accumulated in the power supply 91 can be used as required. Therefore, it is possible, for example, that an electric power from the centralized electric power system 97 is accumulated in the power supply 91 during midnight in which an electric power rate is inexpensive and the electric power accumulated in the power supply 91 is used during the day in which an electric power rate is expensive.

The above-mentioned electric power storage system may be placed in one house (per family), or may be placed in several houses (per several families).

Figure 10:
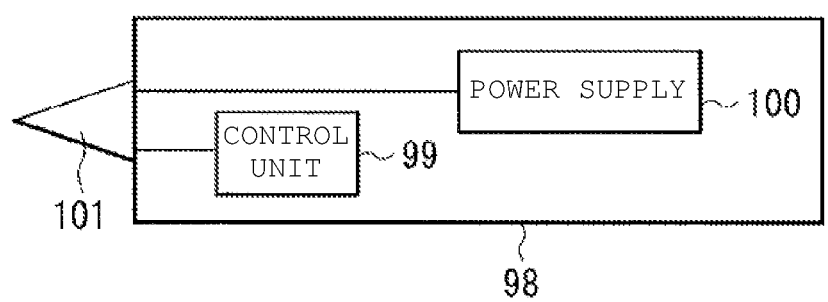
FIG. 10 is a block diagram illustrating the configuration of an application example (an electric power tool) of the secondary battery.

FIG. 10 shows a block configuration diagram of an electric power tool according to an embodiment.

The electric power tool described herein is, for example, an electric drill. The electric power tool is equipped with, for example; a tool main body 98; and a control unit 99 and a power supply 100 both of which are arranged in the tool main body 98. In the tool main body 98, a drill part 101, which is a movable unit, is installed operably (rotatably).

The tool main body 98 contains, for example, a plastic material. The control unit 99 controls the entire operation of the electric power tool (including the state of usage of the power supply 100). The control unit 99 includes, for example, a CPU or a processor. The power supply 100 includes at least one type of secondary battery according to the present technique. The control unit 99 supplies an electric power from the power supply 100 to the drill part 101 in response to the operation of an operation switch.

Examples of the present technology will be described in detail according to embodiments.

Experimental Examples 1-1 to 1-6

Laminate film-type lithium ion secondary batteries each shown in FIGS. 1 and 2 were produced by the following procedures.

For the production of a positive electrode 13, firstly, a positive electrode active material (LiCoO$_2$, median diameter D50=5 μm) (96 parts by mass), a positive electrode binder (polyvinylidene fluoride) (3 parts by mass) and a positive electrode conducting agent (carbon black) (1 part by mass) were mixed together to prepare a positive electrode mix. Subsequently, the positive electrode mix was dispersed in an organic solvent (N-methyl-2-pyrrolidone) to prepare a paste-like positive electrode mix slurry. Subsequently, the positive electrode mix slurry was applied onto both surfaces of a positive electrode current collector 13A (an aluminum foil having a thickness of 15 μm) with a coating machine, and then the positive electrode mix slurry was dried to form positive electrode active material layers 13B. Finally, the positive electrode active material layers 13B were compression-molded with a roll pressing machine, and then the positive electrode current collector 13A having the positive electrode active material layers 13B formed thereon was cut into a strip-shaped piece (width=48 mm, length=300 mm). In this case, the volume density of the positive electrode active material layers 13B was adjusted to 3.8 g/cm$^3$.

For the production of a negative electrode 14, firstly, a negative electrode active material (95 parts by mass), a negative electrode binder (polyvinylidene fluoride) (3 parts by mass) and a negative electrode conducting agent (2 parts by mass) (carbon black) were mixed together to prepare a negative electrode mix. As the negative electrode active material, either one or both of a carbon material (graphite, median diameter D50=7 μm) and a silicon-based material (SiO$_x$ that was a silicon compound, median diameter D50=3 μm) were used. The mixing ratios between the carbon material and the silicon-based material (% by weight) were shown in Table 1. Subsequently, the negative electrode mix was dispersed in an organic solvent (N-methyl-2-pyrrolidone) to prepare a paste-like negative electrode mix slurry. Subsequently, the negative electrode mix slurry was applied onto both surfaces of the negative electrode current collector 14A (a copper foil having a thickness of 15 μm) with a coating machine, and then the negative electrode mix slurry was dried to form negative electrode active material layers 14B. Subsequently, the negative electrode active material layers 14B were heated (temperature=200° C.) to improve the bondability of the negative electrode active material. Finally, the negative electrode active material layers 14B were compression-molded with a roll pressing machine, and then the negative electrode current collector 14A having the negative electrode active material layers 14B formed thereon was cut into a strip-shaped piece (width=50 mm, length=310 mm). In this case, the volume density of the negative electrode active material layers 14B was adjusted to 1.8 g/cm$^3$.

For the formation of electrolyte layers 16, firstly, an unsaturated cyclic carbonic acid ester (methylene ethylene carbonate) was added to a carbonic acid ester (ethylene carbonate and diethyl carbonate) to prepare a solvent. Subsequently, an electrolyte salt (LiPF$_6$) was dissolved in the solvent to prepare an electrolytic solution. In this case, the composition (by weight) of the carbonic acid ester was adjusted to: (ethylene carbonate):(diethyl carbonate)=50:50, and the content of the unsaturated cyclic carbonic acid ester was adjusted to 1% by weight, and the content of the electrolyte salt was adjusted to 1 mol/kg relative to the amount of the solvent.

Subsequently, the electrolytic solution (93 parts by mass), a polymeric compound (polyvinylidene fluoride) (3 parts by mass) and a plurality of inorganic particles (aluminum oxide, median diameter D50=0.5 μm) (4 parts by mass) were mixed together to prepare a mixed solution. Subsequently, the mixed solution was treated with a homogenizer to disperse the polymeric compound and the plurality of inorganic particles in the electrolytic solution homogeneously, and then the mixed solution was stirred while heating (temperature=75° C.). Subsequently, the mixed solution was further stirred (time=30 minutes to 1 hour) to produce a sol-like precursor solution.

Finally, the precursor solution was applied onto both surfaces of the positive electrode 13, and then the precursor solution was dried to form gel-like electrolyte layers 16 (positive electrode-side electrolyte layers 161). The precursor solution was also applied onto both surfaces of the negative electrode 14, and then the precursor solution was dried to form gel-like electrolyte layers 16 (negative electrode-side electrolyte layers 162).

In the formation of the electrolyte layers 16, electrolyte layers 16 each having through-holes 16K provided therein were formed by employing the above-mentioned method using a foaming agent. Namely, positive electrode-side electrolyte layers 161 each having through-holes 16K provided therein and negative electrode-side electrolyte layers 162 each having through-holes 16K provided therein were formed. In this case, the number and the average diameter of the through-holes 16K were altered by adjusting a condition such as the speed of application of the precursor solution. For comparison purposes, electrolyte layers 16 each having no through-hole 16K provided therein were also formed.

The presence of absence, the number (holes/cm$^2$) and the average diameter (mm) of the through-holes 16K are as shown in Table 1.

For the assembly of a secondary battery, firstly, a positive electrode lead 11 was welded to the positive electrode current collector 13A, and a negative electrode lead 12 was welded to the negative electrode current collector 14A. Subsequently, the positive electrode 13 having the electrolyte layers 16 formed thereon and the negative electrode 14 having the electrolyte layers 16 formed thereon were wound with a separator 15 interposed therebetween to produce a wound body. As the separator 15, a triple-layer polymer separator (total thickness=15 μm) that was composed of a porous polypropylene film sandwiched by two porous polyethylene films was used. Subsequently, the wound body was wound in the length direction, and then a protection tape 17 was adhered onto the outermost periphery of the wound body to form a wound electrode body 10. Finally, an external packaging member 20 was folded so as to sandwich the wound electrode body 10 therebetween, and then the outer peripheral edges of the external packaging member 20 were thermally bonded to each other. As a result, the wound electrode body 10 was enclosed in the external packaging member 20. In this case, an adhesion film 21 is inserted between the positive electrode lead 11 and the external packaging member 20, and the adhesion film 21 was also inserted between the negative electrode lead 12 and the external packaging member 20.

In this manner, laminate film-type lithium ion secondary batteries were completed according to an embodiment.

In order to examine the battery properties of each of the secondary batteries, a swelling property and a cycle property were examined. The results shown in Table 1 were obtained.

For the examination of the swelling property, firstly, a battery was subjected to one cycle of charging and discharging in an ambient temperature environment (23° C.) to stabilize the condition of the battery. Subsequently, the secondary battery was subjected to additional one cycle of charging and discharging in the same environment (23° C.), and the thickness of the secondary battery after the second cycle was measured. Subsequently, the charging/discharging was repeated in the same environment (23° C.) until the total number of the cycles became 150 cycles, and the thickness of the secondary battery after the 150$^{th}$ cycle was measured. Finally, a swelling ratio represented by the following formula was determined:

swelling ratio (%)=[((thickness of the secondary battery after the 150$^{th}$ cycle)−(thickness of the secondary battery after the 2$^{nd}$ cycle))/(thickness of the secondary battery after the 2$^{nd}$ cycle)]×100.

For the measurement of the thickness of a secondary battery, the thickness (flat plate thickness) of the secondary battery was measured while applying a load (300 g) to the secondary battery.

For the charging, the secondary battery was charged until the voltage reached 4.4 V at a current of 0.5 C, and was then further charged until the current reached 0.05 C at a voltage of 4.4 V. For the discharging, the secondary battery was discharged until the voltage reaches 3 V at a current of 0.5 C. "0.5 C" is a current value at which a battery capacity (theoretical capacity) can be discharged within 2 hours, and "0.05 C" is a current value at which a battery capacity can be discharged within 20 hours.

For the examination of the cycle property, a discharge capacity after the 2$^{nd}$ cycle was measured and then a discharge capacity after the 150$^{th}$ cycle was measured by the above-mentioned swelling property examination procedure, and then a capacity retention ratio (%) was calculated in accordance with the following formula:

a capacity retention ratio (%)=[(a discharge capacity after the 150$^{th}$ cycle)/(a discharge capacity after the 2$^{nd}$ cycle)]×100.

TABLE 1

| Experimental Example | Negative electrode active material ||||| Electrolyte layer Through-holes ||| Swelling ratio (%) | Capacity retention ratio (%) |
| | Carbon material || Silicon-based material || Presence/ absence | Number (holes/cm$^2$) | Average diameter (mm) | | |
| | Type | Mixing ratio (% by weight) | Type | Mixing ratio (% by weight) | | | | | |
|---|---|---|---|---|---|---|---|---|---|
| 1-1 | Graphite | 95 | SiO$_X$ | 5 | Present | 50 | 1 | 3 | 70 |
| 1-2 | Graphite | 95 | SiO$_X$ | 5 | Absent | — | — | 20 | 60 |
| 1-3 | Graphite | 100 | — | — | Present | 50 | 1 | 3 | 67 |
| 1-4 | Graphite | 100 | — | — | Absent | — | — | 3 | 66 |
| 1-5 | — | — | SiO$_X$ | 100 | Present | 50 | 1 | 39 | 54 |
| 1-6 | — | — | SiO$_X$ | 100 | Absent | — | — | 42 | 52 |

The swelling properties of the secondary batteries largely varied depending on the compositions of the negative electrode active materials, the presence or absence of through-holes 16K and the like.

In the case where only a carbon material was used as the negative electrode active material (Experimental Examples 1-3, 1-4), when through-holes 16K were provided in the electrolyte layers 16, the capacity retention ratio slightly increased but the swelling ratio was not changed. In the case where only a silicon-based material was used as the negative electrode active material (Experimental Examples 1-5, 1-6), when through-holes 16K were provided in the electrolyte layers 16, the swelling ratio slightly decreased and the capacity retention ratio slightly increased.

In the case where a combination of a carbon material and a silicon-based material was used as the negative electrode active material (Experimental Examples 1-1 and 1-2), when through-holes 16K were provided in the electrolyte layers 16, the swelling ratio largely decreased and the capacity retention ratio largely increased. In the case where a combination of a carbon material and a silicon-based material was used, the swelling ratio decreased sufficiently and the capacity retention ratio increased sufficiently when the mixing ratio of the silicon-based material, i.e., the ratio of the weight W2 of the silicon-based material to the sum total of the weight W1 of the carbon material and the weight W2 of the silicon-based material, was 5% by weight to 20% by weight.

Experimental Examples 2-1 to 2-8

The same procedures as in Experimental Examples 1-1 and 1-2 were carried out, except that the composition of the negative electrode active material (the type and mixing ratio of the silicon-based material) was changed to those shown in Table 2. In this manner, secondary batteries were produced, and the battery properties of the secondary batteries were evaluated. As the silicon-based material, a silicon oxide ($SiO_x$) and a silicon alloy (SiTiNi) were used.

In the case where the number of the through-holes 16K per unit area was changed (Table 3), the same results as those shown in Table 1 were obtained. Namely, in the case where a combination of a carbon material and a silicon-based material was used as the negative electrode active

TABLE 2

| Experimental Example | Negative electrode active material | | | | Electrolyte layer Through-holes | | | Capacity | |
|---|---|---|---|---|---|---|---|---|---|
| | Carbon material | | Silicon-based material | | | Number | Average | Swelling | retention |
| | Type | Mixing ratio (% by weight) | Type | Mixing ratio (% by weight) | Presence/ absence | (holes/ $cm^2$) | diameter (mm) | ratio (%) | ratio (%) |
| 1-1 | Graphite | 95 | $SiO_X$ | 5 | Present | 50 | 1 | 3 | 70 |
| 2-1 | Graphite | 90 | $SiO_X$ | 10 | Present | 50 | 1 | 4.5 | 65 |
| 2-2 | Graphite | 80 | $SiO_X$ | 20 | Present | 50 | 1 | 9 | 60 |
| 2-3 | Graphite | 95 | SiTiNi | 5 | Present | 50 | 1 | 7 | 68 |
| 2-4 | Graphite | 95 | SiTiNi | 5 | Present | 50 | 1 | 14 | 65 |
| 1-2 | Graphite | 95 | $SiO_X$ | 5 | Absent | — | — | 20 | 60 |
| 2-5 | Graphite | 90 | $SiO_X$ | 10 | Absent | — | — | 40 | 50 |
| 2-6 | Graphite | 80 | $SiO_X$ | 20 | Absent | — | — | 70 | 40 |
| 2-7 | Graphite | 95 | SiTiNi | 5 | Absent | — | — | 15 | 52 |
| 2-8 | Graphite | 95 | SiTiNi | 5 | Absent | — | — | 35 | 44 |

In the case where the composition of the negative electrode active material was changed (Table 2), the same results as those shown in Table 1 were obtained. Namely, in the case where a combination of a carbon material and a silicon-based material was used as the negative electrode active material, when through-holes 16K were provided in the electrolyte layer 16 (Experimental Examples 2-1 to 2-4), the swelling ratio largely decreased and the capacity retention ratio largely increased compared with the case where no through-hole 16K was provided in the electrolyte layer 16 (Experimental Examples 2-5 to 2-8).

Experimental Examples 3-1 to 3-7

The procedures as in Experimental Example 1-1 were carried out, except that the number of the through-holes 16K per unit area (holes/$cm^2$) was changed to those shown in Table 3. In this manner, secondary batteries were produced, and the battery properties of the secondary batteries were evaluated. In this case, the number of the through-holes 16K per unit area was adjusted by changing a condition such as the speed of application of the precursor solution.

material, when through-holes 16K were provided in the electrolyte layer 16 (Experimental Examples 3-1 to 3-7), the swelling ratio decreased sufficiently and the capacity retention ratio increased sufficiently.

In this case, particularly when the number of the through-holes 16K per unit area was 1 hole/$cm^2$ to 100 holes/$cm^2$ (Experimental Examples 1-1, 3-1 to 3-5), a high capacity retention ratio can be obtained while sufficiently reducing the swelling ratio.

Experimental Examples 4-1 to 4-8

The same procedures as in Experimental Example 1-1 were carried out, except that the average diameter (mm) of the through-holes 16K was changed to those shown in Table 4. In this manner, secondary batteries were produced, and the battery properties of the secondary batteries were evaluated. In this case, the average diameter of the through-holes 16K was adjusted by changing a condition such as the content of the polymeric compound in the precursor solution.

TABLE 3

| Experimental Example | Negative electrode active material | | | | Electrolyte layer | | | | Capacity |
|---|---|---|---|---|---|---|---|---|---|
| | Carbon material | | Silicon-based material | | | Through-holes | | | |
| | | Mixing ratio (% by weight) | | Mixing ratio (% by weight) | | Number | Average | Swelling | retention |
| | Type | | Type | | Presence/ absence | (holes/ $cm^2$) | diameter (mm) | ratio (%) | ratio (%) |
| 3-1 | Graphite | 95 | $SiO_X$ | 5 | Present | 1 | 1 | 4 | 72 |
| 3-2 | Graphite | 95 | $SiO_X$ | 5 | Present | 10 | 1 | 3.5 | 71 |
| 3-3 | Graphite | 95 | $SiO_X$ | 5 | Present | 25 | 1 | 2.5 | 70 |
| 1-1 | Graphite | 95 | $SiO_X$ | 5 | Present | 50 | 1 | 3 | 70 |
| 3-4 | Graphite | 95 | $SiO_X$ | 5 | Present | 75 | 1 | 2 | 65 |
| 3-5 | Graphite | 95 | $SiO_X$ | 5 | Present | 100 | 1 | 1.5 | 63 |
| 3-6 | Graphite | 95 | $SiO_X$ | 5 | Present | 101 | 1 | 0.3 | 48 |
| 3-7 | Graphite | 95 | $SiO_X$ | 5 | Present | 110 | 1 | 0.1 | 31 |

TABLE 4

| | Negative electrode active material | | | | Electrolyte layer | | | Capacity | |
| --- | --- | --- | --- | --- | --- | --- | --- | --- | --- |
| | Carbon material | | Silicon-based material | | | Through-holes | | | |
| Experimental Example | Type | Mixing ratio (% by weight) | Type | Mixing ratio (% by weight) | Presence/ absence | Number (holes/ cm$^2$) | Average diameter (mm) | Swelling ratio (%) | retention ratio (%) |
| 4-1 | Graphite | 95 | SiO$_X$ | 5 | Present | 50 | 0.01 | 15 | 75 |
| 4-2 | Graphite | 95 | SiO$_X$ | 5 | Present | 50 | 0.02 | 6 | 74 |
| 4-3 | Graphite | 95 | SiO$_X$ | 5 | Present | 50 | 0.1 | 4 | 73 |
| 4-4 | Graphite | 95 | SiO$_X$ | 5 | Present | 50 | 0.5 | 3.5 | 72 |
| 1-1 | Graphite | 95 | SiO$_X$ | 5 | Present | 50 | 1 | 3 | 70 |
| 4-5 | Graphite | 95 | SiO$_X$ | 5 | Present | 50 | 1.5 | 2 | 65 |
| 4-6 | Graphite | 95 | SiO$_X$ | 5 | Present | 50 | 2 | 0.2 | 63 |
| 4-7 | Graphite | 95 | SiO$_X$ | 5 | Present | 50 | 2.1 | 0.3 | 45 |
| 4-8 | Graphite | 95 | SiO$_X$ | 5 | Present | 50 | 2.5 | 0.1 | 33 |

In the case where the average diameter of the through-holes 16K was changed (Table 4), the same results as those shown in Table 1 were obtained. Namely, in the case where a combination of a carbon material and a silicon-based material was used as the negative electrode active material, when through-holes 16K were provided in the electrolyte layer 16 (Experimental Examples 4-1 to 4-8), the swelling ratio decreased sufficiently and the capacity retention ratio increased sufficiently.

In this case, particularly when the average diameter of the through-holes 16K was 0.02 mm to 2 mm (Experimental Examples 1-1, 4-2 to 4-6), a high capacity retention ratio was obtained while sufficiently reducing the swelling ratio.

Experimental Examples 5-1 to 5-4

The same procedures as those in Experimental Examples 1-1 and 1-2 were carried out, except that an unsaturated cyclic carbonic acid ester (vinylene carbonate: VC) or a halogenated carbonic acid ester (4-fluoro-1,3-dioxolan-2-one: FEC) was added as an additive (additional solvent) to an electrolytic solution as shown in Table 5. In this manner, secondary batteries were produced, and the battery properties of the secondary batteries were evaluated. In this case, the content of the unsaturated cyclic carbonic acid ester in the electrolytic solution was adjusted to 1% by weight and the content of the halogenated carbonic acid ester in the electrolytic solution was adjusted to 1% by weight.

In the case where the composition of the electrolytic solution was changed (Table 5), the same results as those shown in Table 1 were obtained. Namely, in the case where a combination of a carbon material and a silicon-based material was used as the negative electrode active material, when through-holes 16K were provided in the electrolyte layer 16 (Experimental Examples 5-1 to 5-4), the swelling ratio decreased sufficiently and the capacity retention ratio increased sufficiently.

In this case, particularly when the electrolytic solution contained an unsaturated cyclic carbonic acid ester or a halogenated carbonic acid ester (Experimental Examples 5-1 to 5-4), the capacity retention ratio further increased while minimizing the increase in the swelling ratio.

From the results shown in Tables 1 to 5, it was demonstrated that, when the negative electrode contained a carbon material and a silicon-based material and each of the electrolyte layers had one or more through-holes extending in the thickness direction thereof, the swelling property or the like of the secondary battery was improved. Consequently, excellent battery properties were achieved in secondary batteries each equipped with electrolyte layers.

Hereinabove, the present technology has been described with reference to its embodiments and examples. However, the present technology is not limited to those embodiments and examples, and various changes and modifications may be made in the technique. For example, the present technology has been described taking embodiments in which the battery structures are of a laminate film type and each of the

TABLE 5

| | Negative electrode active material | | | | Electrolyte layer | | | | Capacity | |
| --- | --- | --- | --- | --- | --- | --- | --- | --- | --- | --- |
| | Carbon material | | Silicon-based material | | | Through-holes | | | | |
| Experimental Example | Type | Mixing ratio (% by weight) | Type | Mixing ratio (% by weight) | Presence/ absence | Number (holes/ cm$^2$) | Average diameter (mm) | Electrolytic solution Additive | Swelling ratio (%) | retention ratio (%) |
| 1-1 | Graphite | 95 | SiO$_X$ | 5 | Present | 50 | 1 | — | 3 | 70 |
| 5-1 | Graphite | 95 | SiO$_X$ | 5 | Present | 50 | 1 | VC | 5 | 73 |
| 5-2 | Graphite | 95 | SiO$_X$ | 5 | Present | 50 | 1 | FEC | 6 | 75 |
| 1-2 | Graphite | 95 | SiO$_X$ | 5 | Absent | — | — | — | 20 | 60 |
| 5-3 | Graphite | 95 | SiO$_X$ | 5 | Absent | — | — | VC | 30 | 63 |
| 5-4 | Graphite | 95 | SiO$_X$ | 5 | Absent | — | — | FEC | 45 | 65 | battery elements has a wound structure as examples. However, the present technology is not limited to these embodiments. The secondary battery according to the present technology is applicable to a case where the battery structure is of other structure such as a cylindrical form, a square form and a coin-like form, and a case where the battery element has other structure such as a laminate structure.

In the embodiments and the examples, a lithium ion secondary battery in which the capacity of a negative electrode can be produced through the storage/release of lithium has been described herein. However, the present technology is not limited to the lithium ion secondary battery. For example, the secondary battery according to the present technique may be a lithium metal secondary battery in which the capacity of a negative electrode can be produced through the deposition/dissolution of lithium. The secondary battery according to the present technique may also be a secondary battery in which the capacity of a negative electrode can be produced from the sum total of the capacity produced through the storage/release of lithium and the capacity produced through the deposition/dissolution of lithium by reducing the capacity of a negative electrode material capable of storing/releasing lithium to a value smaller than the capacity of a positive electrode.

In the embodiments and the examples, a case where lithium is used as the electrode reactive substance has been described. However, the present technique is not limited to this case. The electrode reactive substance may be, for example, other element belonging to Group 1 in the long-period periodic table, such as sodium (Na) and potassium (K), or may be an element belonging to Group 2 in the long-period periodic table, such as magnesium (Mg) and calcium (Ca), or may be other light metal such as aluminum (Al). Alternatively, the electrode reactive substance may also be an alloy containing at least one type of the group of elements described herein.

It should be understood that the effects described in this description are illustrative only and not restrictive, and the effects of the present technology are not limited thereto and may be other effects.

The present technology is described below in further detail according to an embodiment.

(1) A secondary battery including:
a positive electrode;
a negative electrode that contains a carbon material and a silicon-based material; and
an electrolyte layer that contains an electrolytic solution and a polymeric compound and has one or more through-holes extending in the thickness direction thereof.

(2) The secondary battery according to item (1), wherein the silicon-based material is present in portions of the negative electrode which overlap with the through-holes.

(3) The secondary battery according to item (1) or (2), wherein the number of the one or more through-holes per unit area of the electrolyte layer is 1 hole/cm$^2$ to 100 holes/cm$^2$.

(4) The secondary battery according to any one of items (1) to (3), wherein the average diameter of the one or more through-holes is 0.02 mm to 2 mm.

(5) The secondary battery according to any one of items (1) to (4), wherein the ratio of the weight W2 of the silicon-based material to the sum total of the weight W1 of the carbon material and the weight W2 of the silicon-based material (=[W2/(W1+W2)]×100) is 5% by weight to 20% by weight.

(6) The secondary battery according to any one of items (1) to (5), wherein the silicon-based material includes at least one type of component selected from a simple substance of silicon, a silicon compound and a silicon alloy.

(7) The secondary battery according to any one of items (1) to (6), wherein the electrolyte layer includes a positive electrode-side electrolyte layer provided on the positive electrode; and a negative electrode-side electrolyte layer provided on the negative electrode, and at least one of the positive electrode-side electrolyte layer and the negative electrode-side electrolyte layer has the one or more through-holes.

(8) The secondary battery according to any one of items (1) to (7), wherein the electrolyte layer further contains a plurality of inorganic particles, and each of the plurality of inorganic particles contains at least one type of compound selected from aluminum oxide, zirconium oxide, titanium oxide and magnesium oxide.

(9) The secondary battery according to any one of items (1) to (8), wherein the electrolytic solution contains at least one of an unsaturated cyclic carbonic acid ester and a halogenated carbonic acid ester.

(10) The secondary battery according to any one of items (1) to (9), wherein the secondary battery is a lithium ion secondary battery.

(11) A battery pack including:
a secondary battery as recited in any one of items (1) to (10);
a control unit for controlling the operation of the secondary battery; and
a switching unit for switching the operation of the secondary battery in response to a command from the control unit.

(12) An electric vehicle including:
a secondary battery as recited in any one of items (1) to (10);
a conversion unit for converting an electric power supplied from the secondary battery to a driving force;
a driving unit for driving in response to the driving force; and
a control unit for controlling the operation of the secondary battery.

(13) An electric power storage system including:
a secondary battery as recited in any one of items (1) to (10);
at least one type of electric device to which an electric power is supplied from the secondary battery; and
a control unit for controlling the supply of an electric power from the secondary battery to the electric device.

(14) An electric power tool including:
a secondary battery as recited in any one of items (1) to (10); and
a movable unit to which an electric power is supplied from the secondary battery.

(15) An electronic device equipped with a secondary battery as recited in any one of items (1) to (10) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising: a positive electrode; a negative electrode including a carbon material and a silicon-based material; and an electrolyte layer, wherein the electrolyte layer includes an electrolytic solution and a polymeric compound, and wherein the electrolyte layer includes one or more through-holes extending in a thickness direction of the electrolyte layer, wherein a number of the one or more through-holes per unit area of the electrolyte layer is from 1 hole/cm$^2$ to 100 hole/cm$^2$.

2. The secondary battery according to claim 1, wherein the silicon-based material is provided in a portion of the negative electrode, and wherein the portion overlaps with at least one of the through-holes.

3. The secondary battery according to claim 1, wherein an average diameter of the one or more through-holes is from 0.02 mm to 2 mm.

4. The secondary battery according to claim 1, wherein a ratio of a weight W2 of the silicon-based material to a sum total of a weight W1 of the carbon material and the weight W2 of the silicon-based material is from 5% by weight to 20% by weight.

5. The secondary battery according to claim 1, wherein the silicon-based material one or more of a simple substance of silicon, a silicon compound and a silicon alloy.

6. The secondary battery according to claim 1, wherein the electrolyte layer includes a positive electrode-side electrolyte layer provided on the positive electrode; and a negative electrode-side electrolyte layer provided on the negative electrode, and at least one of the positive electrode-side electrolyte layer and the negative electrode-side electrolyte layer includes the one or more through-holes.

7. The secondary battery according to claim 1, wherein the electrolyte layer further includes a plurality of inorganic particles, and each of the plurality of inorganic particles includes one or more compounds selected from the group consisting of aluminum oxide, zirconium oxide, titanium oxide, magnesium oxide and combinations thereof.

8. The secondary battery according to claim 1, wherein the electrolytic solution includes one or both of an unsaturated cyclic carbonic acid ester and a halogenated carbonic acid ester.

9. The secondary battery according to claim 1, wherein the secondary battery includes a lithium ion secondary battery.

10. A battery pack comprising: a secondary battery; a control unit configured to control the operation of the secondary battery; and a switching unit configured to switch the operation of the secondary battery in response to a command from the control unit, wherein the secondary battery includes: a positive electrode, a negative electrode including a carbon material and a silicon-based material, and an electrolyte layer, wherein the electrolyte layer includes an electrolytic solution and a polymeric compound, and wherein the electrolyte layer includes one or more through-holes extending in a thickness direction of the electrolyte layer, wherein a number of the one or more through-holes per unit area of the electrolyte layer is from 1 hole/cm$^2$ to 100 hole/cm$^2$.

11. An electric vehicle comprising: a secondary battery; a conversion unit configured to convert an electric power supplied from the secondary battery to a driving force; a driving unit configured to drive in response to the driving force; and a control unit configured to control the operation of the secondary battery, wherein the secondary battery includes: a positive electrode, a negative electrode including a carbon material and a silicon-based material, and an electrolyte layer, wherein the electrolyte layer includes an electrolytic solution and a polymeric compound, and wherein the electrolyte layer includes one or more through-holes extending in a thickness direction of the electrolyte layer, wherein a number of the one or more through-holes per unit area of the electrolyte layer is from 1 hole/cm$^2$ to 100 hole/cm$^2$.

12. An electric power storage system comprising:

a secondary battery according to claim 1;

at least one type of electric device to which an electric power is supplied from the secondary battery; and a control unit configured to control the supply of an electric power from the secondary battery to the electric device.

13. An electric power tool comprising:

a secondary battery according to claim 1; and a movable unit to which an electric power is supplied from the secondary battery.

14. An electronic device equipped with a secondary battery according to claim 1 as an electric power supply source.

* * * * *